US009962697B2

(12) United States Patent
Tonkovich et al.

(10) Patent No.: US 9,962,697 B2
(45) Date of Patent: May 8, 2018

(54) IN SITU MIXING IN MICROCHANNELS

(71) Applicant: Velocys, Inc., Plain City, OH (US)

(72) Inventors: Anna Lee Tonkovich, Gilbert, AZ (US); Kai Jarosch, Abingdon (GB); David J. Hesse, Columbus, OH (US); Sean P. Fitzgerald, Columbus, OH (US)

(73) Assignee: Velocys, Inc., Plain City, OH (US)

( * ) Notice: Subject to any disclaimer, the term of this patent is extended or adjusted under 35 U.S.C. 154(b) by 681 days.

(21) Appl. No.: 14/176,976

(22) Filed: Feb. 10, 2014

(65) Prior Publication Data
US 2014/0377144 A1 Dec. 25, 2014

Related U.S. Application Data

(62) Division of application No. 12/334,550, filed on Dec. 15, 2008, now Pat. No. 8,646,472, and a division of application No. 10/848,559, filed on May 17, 2004, now Pat. No. 7,470,408.

(60) Provisional application No. 60/531,006, filed on Dec. 18, 2003.

(51) Int. Cl.
*B01L 3/00* (2006.01)
*B01F 5/04* (2006.01)
*B01F 5/06* (2006.01)
*B01F 13/00* (2006.01)
*B01J 19/00* (2006.01)

(52) U.S. Cl.
CPC ...... *B01L 3/502715* (2013.01); *B01F 5/0475* (2013.01); *B01F 5/0682* (2013.01); *B01F 5/0691* (2013.01); *B01F 13/0059* (2013.01); *B01J 19/0093* (2013.01); *B01F 2215/0427* (2013.01); *B01F 2215/0431* (2013.01); *B01J 2219/0086* (2013.01); *B01J 2219/00783* (2013.01); *B01J 2219/00822* (2013.01); *B01J 2219/00824* (2013.01); *B01J 2219/00835* (2013.01); *B01J 2219/00844* (2013.01); *B01J 2219/00873* (2013.01); *B01J 2219/00889* (2013.01); *B01J 2219/00891* (2013.01); *B01L 2400/04* (2013.01); *Y10T 137/0329* (2015.04)

(58) Field of Classification Search
CPC .......................... B01F 13/0059; B01F 13/0061
See application file for complete search history.

(56) References Cited

U.S. PATENT DOCUMENTS

| | | |
|---|---|---|
| 5,405,586 A | 4/1995 | Koves |
| 5,609,834 A | 3/1997 | Hamada et al. |
| 5,700,434 A | 12/1997 | Gaiser |
| 5,811,062 A | 9/1998 | Wegeng et al. |
| 5,997,826 A | 12/1999 | Lodeng et al. |
| 6,117,578 A | 9/2000 | Lesieur |
| 6,118,038 A | 9/2000 | Lankton et al. |
| 6,159,358 A | 12/2000 | Mulvaney et al. |
| 6,159,434 A | 12/2000 | Gonjo et al. |
| 6,166,283 A | 12/2000 | Bharadwaj |
| 6,168,765 B1 | 1/2001 | Romantier et al. |
| 6,180,846 B1 | 1/2001 | Dandekar et al. |
| 6,187,273 B1 | 2/2001 | Gaiser |
| 6,190,624 B1 | 2/2001 | Romantier |
| 6,228,341 B1 | 5/2001 | Herbert et al. |
| 6,264,900 B1 | 7/2001 | Schubert et al. |
| 6,274,101 B1 | 8/2001 | Sechrist |
| 6,294,128 B1 | 9/2001 | Crosbie |
| 6,365,543 B1 | 4/2002 | Schmidt et al. |
| 6,488,838 B1 | 12/2002 | Tonkovich et al. |
| 6,566,573 B1 | 5/2003 | Bharadwaj |
| 6,709,640 B1 | 3/2004 | Romantier et al. |
| 6,843,942 B2 | 1/2005 | Kattinger et al. |
| 7,294,734 B2 * | 11/2007 | Brophy ............... B01J 19/0093 558/317 |
| 7,473,404 B2 | 1/2009 | Chopard et al. |
| 7,803,325 B2 | 9/2010 | Tonkovich et al. |
| 2003/0007904 A1 | 1/2003 | Tonkovich et al. |
| 2003/0068261 A1 | 4/2003 | Taheri et al. |
| 2004/0032037 A1 | 2/2004 | Katinger et al. |
| 2004/0034266 A1* | 2/2004 | Brophy ............... B01J 19/0093 585/658 |
| 2004/0082804 A1 | 4/2004 | Brophy et al. |
| 2004/0105813 A1 | 6/2004 | Vanden Busche et al. |
| 2004/0125689 A1 | 7/2004 | Ehrfeld et al. |
| 2004/0199039 A1 | 10/2004 | Brophy et al. |
| 2004/0220434 A1 | 11/2004 | Brophy et al. |
| 2005/0048333 A1 | 3/2005 | Pettit |
| 2005/0256358 A1 | 11/2005 | Wang et al. |

FOREIGN PATENT DOCUMENTS

DE 3926466 2/1991
WO WO 02064248 A2 * 8/2002 ............ B01J 12/007

OTHER PUBLICATIONS

JP Patent Application No. 2006-54513 dated Jul. 14, 2015, Trial Decision, Japanese with English translation.
JP Patent Application No. 2006-54513 dated Oct. 30, 2013, Reexamination Report, Japanese with English translation.
From PCT Application No. PCT/US2004/042206 Written Opinion of the International Searching Authority dated May 23, 2005.
From PCT Application No. PCT/US2004/042206 International Search Report dated May 25, 2005.
From PCT Application No. PCT/US2004/042206 International Preliminary Report on Patentability dated Jun. 20, 2006.
From Canadian Patent Application 2,550,079, Examiner's Requisition dated Jul. 30, 2012.
From Canadian Patent Application 2,550,079, Examiner's Requisition dated Oct. 8, 2013.
From CN Application No. 200480041671.7 First Office Action dated Oct. 31, 2008.
From CN Application No. 200480041671.7 Second Office Action dated Dec. 19, 2011.
From CN Application No. 201201352903.7 First Office Action dated May 30, 2014.

(Continued)

*Primary Examiner* — Randy Boyer
(74) *Attorney, Agent, or Firm* — Frank Rosenberg

(57) ABSTRACT

The present invention provides methods, systems and apparatus in which one fluid passes through an orifice or orifices and mixes with another fluid as it flows through a microchannel.

5 Claims, 23 Drawing Sheets

(56) References Cited

OTHER PUBLICATIONS

From EP Application No. 04 814 396.0 Communication pursuant to Article 94(3) EPC dated Nov. 22, 2010.
From JP Patent Application No. 2006-545413 Notice of Reasons for Rejection dated Sep. 14, 2010.
From JP Patent Application No. 2006-545413 Notice of Reasons for Rejection dated Jan. 10, 2012.
From JP Patent Application No. 2006-545413 Decision of Refusal dated Jan. 15, 2013.
From JP Patent Application No. 2013-103541 Notice of Reasons for Rejection dated Apr. 8, 2014.
R.L.J. Fernades, "Opposed Round Jets Issuing Into a Small Aspect Ratio Channel Cross Flow", Experimental Thermal and Fluid Science, 1996; 13:374394.

* cited by examiner

IN SITU MIXING IN MICROCHANNELS

RELATED APPLICATIONS

This application is a divisional of Ser. No. 12/334,550 filed Dec. 15, 2008, now U.S. Pat. No. 8,646,472, which was a divisional of Ser. No. 10/848,559 filed May 17, 2004, now U.S. Pat. No. 7,470,408, which claimed priority to U.S. Provisional Application Nos. 60/531,006, filed Dec. 18, 2003, which is incorporated herein as if reproduced in full below.

FIELD OF THE INVENTION

This invention relates to mixing in microchannels.

INTRODUCTION

Mixing of one fluid into another is a process that is critically important to a wide variety of chemical processes. Because it is of fundamental importance, great efforts have been made over many, many years to improve mixing quality and speed. For processes that require explosive combinations of reactants, safety is another, extremely important consideration. One example of mixing two fluids can be found in U.S. Pat. No. 6,471,937. In this patent, Anderson et al. describe mixing a first reactant with a second reactant at a high velocity (preferably greater than 300 m/s) and short contact time (preferably less than 0.5 milliseconds) before passing the mixture into a reaction chamber containing a solid catalyst. Anderson et al. provide examples of mixing methane and oxygen. Although these examples permit estimation of the first reactant momentum flux, no details of the injection method (e.g., orifice number and size) are provided for the second reactant. Therefore momentum flux for the second reactant cannot be calculated from these examples, and no optimal momentum flux ratio ranges for good mixing can be inferred. In another example, Hamada et al. in U.S. Pat. No. 5,609,834 described mixing fuel into an oxidant through a porous plate and into a combustion chamber where the fuel and oxygen combust to create heat that is used to drive an endothermic reaction in an adjacent reaction chamber.

In recent years, reactors and other chemical processing apparatus have been designed with extremely small internal dimensions (that is, microchannel dimensions) in order to take advantage of the very short mass transfer and heat transfer distances that are obtainable in microchannel apparatus. Another advantage of microchannels is that the microchannel dimensions can be less than the quench diameter of an explosive mixture and therefore can be substantially safer than conventional apparatus. Some examples of mixing fluid streams in microchannel apparatus have been described by Tonkovich et al. in WO 01/12312. In another example, see WO 02/064248 A2, Tonkovich et al. describe flowing reactants in separate parallel streams and combining these streams at a T-joint immediately before passing the combined stream into the reaction chamber of a microchannel device.

Despite these and other efforts over many years, there remains a need for faster and more efficient mixing techniques, and especially for new mixing techniques in microchannel apparatus.

SUMMARY OF THE INVENTION

In a first aspect, the invention provides a method of conducting a reaction within a microchannel device, comprising: flowing a first fluid in a microchannel and flowing a second fluid through the at least one orifice and into the microchannel that mixes with the first fluid. The microchannel comprises a solid catalyst disposed in at least one section of the microchannel. The microchannel is defined by a microchannel wall or walls and at least one orifice is present in the microchannel wall or walls. The at least one orifice is disposed at a section of the microchannel that does not contain catalyst.

The invention also provides a microchannel reaction system, comprising: a microchannel comprising a first reactant fluid; wherein the microchannel comprises a solid catalyst disposed in at least one section of the microchannel; wherein the microchannel is defined by a microchannel wall or walls and wherein at least one orifice is present in the microchannel wall or walls; and wherein the at least one orifice is disposed at a mixing section of the microchannel that does not contain catalyst, wherein a second reactant fluid flows through the at least one orifice and wherein substantially no reaction occurs in the mixing section.

In another aspect, the invention provides a method of conducting a reaction using a microchannel device, comprising: flowing a first reactant in a microchannel; wherein the microchannel is defined by a microchannel wall or walls and wherein at least one orifice is present in the microchannel wall or walls; wherein a first section of the microchannel is defined by a first hydraulic diameter and a second section of the microchannel is defined by a second hydraulic diameter that is larger than that of the first section; wherein the first section is disposed upstream of the second section; wherein the at least one orifice is disposed upstream of the second section; and flowing a second reactant through the at least one orifice and into the microchannel.

In a further aspect, the invention provides a method of mixing fluids in a microchannel, comprising: passing a first fluid through a microchannel that has at least two orifices; and passing a second fluid through the at least two orifices. The second fluid flows into the first fluid at a momentum flux ratio in the range of 10 and 400, more preferably between 40 and 200.

In another aspect, the invention provides a method of mixing fluids in a microchannel, comprising: flowing a first fluid in a first direction through a microchannel and flowing a second fluid in a second direction through a first channel. The second direction is at an angle of 45° to 135° relative to the first direction. The microchannel is defined by at least one channel wall and the channel wall has at least one orifice. A portion of the first channel is adjacent to the microchannel. At a point where the first channel is adjacent to the microchannel, a portion of the second fluid flows through the at least one orifice and mixes with the first fluid. A third fluid flows in a third direction through a second channel. The third direction is at an angle of 45° to 135° relative to the first direction. A portion of the second channel is adjacent to the microchannel. In this aspect, "adjacent" means that the channels share a common wall.

In another aspect, the invention provides microchannel apparatus, comprising: a microchannel having a central axis (defined by line through center of cross-sectional area) that extends in a first direction; a first channel having a central axis (defined by line through center of cross-sectional area) that extends in a second direction; wherein the second direction is at an angle of 45° to 135° relative to the first direction; wherein the microchannel is defined by at least one channel wall and the channel wall has at least one orifice; wherein a portion of the first channel is adjacent to the microchannel; wherein, at a point where the first channel is adjacent to the microchannel, the at least one orifice connects the microchannel with the first channel; and a second channel having a central axis (defined by line through center of cross-sectional area) that extends in a third direction; wherein the third direction is at an angle of 45° to 135° relative to the first direction; wherein a portion of the second channel is adjacent to the microchannel.

In a further aspect, the invention provides a system that mixes fluids in a microchannel, comprising: a first fluid flowing in a microchannel; a second fluid flowing in a direction in a conduit that is adjacent to the microchannel; wherein the second fluid is flowing into the conduit with a momentum number of 0.05 or greater; wherein the second fluid flows into the first fluid in the microchannel through at least two orifices that connect the conduit and microchannel; wherein the at least two orifices comprise a first orifice and a second orifice and wherein the second orifice is further in said direction than the first orifice; wherein the first orifice comprises a first cross-sectional area and the second orifice comprises a second cross-sectional area; and wherein the second cross-sectional area is smaller than the first cross-sectional area. In a preferred embodiment, the first cross-sectional area of the first orifice is adjacent to the conduit; the second cross-sectional area of the second orifice is adjacent to the conduit; the first orifice comprises a third cross-sectional area that is adjacent to the microchannel; the second orifice comprises a fourth cross-sectional area that is adjacent to the microchannel; and the third and fourth cross-sectional areas are substantially the same. In another preferred embodiment, the orifices are not tortuous (this is a preferred embodiment of all of the aspects described herein).

The ratio of the manifold's head to its friction loss, momentum number (Mo), is defined by the following equation:

$$Mo = \frac{\frac{1}{2\rho}[G^2 - 0]}{\frac{4fL}{D}\frac{G^2}{2\rho}} = \left\{\frac{4fL}{D}\right\}^{-1}$$

where,
D [m]=manifold hydraulic diameter at the manifold reference point
f [dimensionless]=Fanning friction factor for the manifold reference point
L [m]=length of the manifold
G [kg/m$^2$/s]=mass flux rate at the manifold reference point
ρ [kg/m$^3$]=Density of the fluid
Considering the case of a manifold having plural orifices (orifices are one type of connecting channel): the reference point of header manifold Reynolds number, mass flux rate, density and hydraulic diameter for the momentum number are defined at the position on the manifold channel axis where the wall plane closest to the header entrance belonging to the connecting channel closest to the entrance in the manifold connects with the manifold channel axis. In the typical, simple case, the length L is the distance from the "first" orifice to the "last" orifice in a series of orifices that run down the length of a header (center line of the first orifice to center line of the last orifice). Generally, the length of the header manifold L is taken from the reference point to the end of the manifold, where the wall plane farthest away from the header entrance belonging to the connecting channel farthest from the entrance in the manifold connects with the manifold channel axis. The equations for the footer manifold are analogous to the header manifold but the reference point is at the last orifice of the footer before the exit. The footer manifold Reynolds number, mass flux rate, density and hydraulic diameter for the momentum number are defined at a reference point at the position where the wall plane closest to the footer exit belonging to the connecting channel closest to footer exit connects with the manifold channel axis. The length of the footer manifold L is taken from the reference point to the beginning of the manifold, where the wall plane farthest away from the footer exit belonging to the connecting channel farthest away from the footer exit in the manifold connects with the manifold channel axis.

In another aspect, the invention provides a method of mixing fluids in a microchannel, comprising: flowing a first fluid in a microchannel; wherein the microchannel is defined by a microchannel wall or walls and wherein at least one orifice is present in the microchannel wall or walls; wherein at the section of the microchannel comprising the at least one orifice, the microchannel has a first hydraulic diameter; wherein the at least one orifice has a narrowest portion and the narrowest portion has a second hydraulic diameter; and flowing a second reactant through the at least one orifice and into the microchannel; wherein the ratio of the first hydraulic diameter to the second hydraulic diameter is in the range of 2 to 6.

The invention further provides microchannel apparatus, comprising: a manifold adjacent to a microchannel along a plane; wherein the microchannel is connected to the manifold via at least two orifices; wherein the manifold adjacent to a microchannel along a plane comprises an open area having an outer perimeter; wherein said outer perimeter is defined by the open area adjacent to the microchannel that is outside of any orifices connected to the microchannel; and wherein the outer perimeter has a thickness that is at least 3 orifice diameters larger than the diameter of the largest orifice that connects the manifold to the microchannel.

In another aspect, the invention provides microchannel apparatus, comprising: a manifold adjacent to a microchannel; wherein the microchannel is connected to the manifold via at least three orifices; wherein the at least three orifices are disposed about a plane of symmetry and wherein the at least three orifices are not in a straight line.

In a further aspect, the invention provides microchannel apparatus, comprising: a manifold adjacent to a microchannel; wherein the microchannel is connected to the manifold via at least three orifices—a central orifice and at least two orifices radially disposed from the central orifice; and wherein the at least two orifices have larger cross-sections than the central orifice.

In yet another aspect, the invention provides a system in which at least two fluids are mixed, comprising: a first fluid flowing through a microchannel; and a second fluid flowing in a direction through a conduit that is adjacent to the microchannel. The microchannel is connected to the conduit via at least two orifices. The orifices comprise shapes, viewed in the direction of flow through the conduit, that comprises a sequence of shapes selected from the group comprising: circular and triangular with one vertex pointed downstream; triangular with one vertex pointed downstream and slot with the long axis perpendicular to flow direction; slot with the long axis parallel to flow direction and triangular with one vertex pointed downstream; and slot with the long axis parallel to flow direction and circular.

In a further aspect, the invention provides a system in which at least two fluids are mixed, comprising: a first fluid flowing through a microchannel; and a second fluid flowing in a direction through a conduit that is adjacent to the microchannel. In this aspect, the microchannel and the conduit are separated by a microchannel wall and the microchannel is connected to the conduit via at least one non-circular orifice through the microchannel wall. Furthermore, the at least one non-circular orifice comprises at least one straight segment on the periphery of the orifice. In this aspect, there is not an orifice opposite the at least one non-circular orifice having at least one straight segment on the periphery of the orifice. The microchannel has a second microchannel wall that is opposite the wall comprising at least one non-circular orifice having at least one straight segment on the periphery of the orifice. The second fluid flows through the at least one non-circular orifice having at least one straight segment on the periphery of the orifice into the first fluid. In some preferred embodiments, heat is transferred through the second microchannel wall.

The present invention includes any of the designs described herein, including reactor designs and orifice designs, and any combination of the designs. However, the designs illustrated in the figures are merely exemplary and are not intended to limit the invention. It should be appreciated that the invention includes any of the apparatus described herein described in terms of microchannel chemical systems including the apparatus with fluids flowing through the apparatus. The invention can also be described by the various parameters and values described in the descriptions and examples.

Advantages

In many of the preferred embodiments, fluids are mixed in a zone that does not contain any catalyst. There are several strong advantages for mixing inside of microchannels, and away from a microchannel heterogeneous catalyst zone, including the following: safe mixing of reactants within the flammability regime before the reaction zone; mixing of a diluent after the reaction section to quench a reaction or to move the mixture composition outside of the flammability region before entering macro connections; avoiding damage to a solid catalyst; or avoiding unwanted entrainment of solid catalyst.

Glossary

A "diluent" is a nonreactive fluid, inhibitor, or a safening agent (for example, an agent that reduces flammability of a mixture).

In the present invention, a "microchannel" is defined as a channel having at least one dimension of 2 millimeters or less, in some embodiments 1 millimeters or less, and in some embodiments, 0.1 to 1 millimeters. As is understood in the art, a microchannel is not merely an orifice. The length of a microchannel (that is, the direction of flow during normal operation) is not the shortest dimension of a microchannel. Both height and width of a microchannel are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of a microchannel is preferably about 2 mm or less, and more preferably 1 mm or less. Preferably, the length of a microchannel is greater than 1 cm, in some embodiments in the range of about 1 to 50 cm. The sides of the microchannel are defined by a microchannel wall of walls. The choice of material for the walls depends on the intended use. These walls are preferably made of a hard material such as a ceramic, an iron based alloy such as steel, or monel. In some embodiments, the microchannel walls are comprised of a stainless steel or Inconel® which is durable and has good thermal conductivity. The microchannel devices can be made by known methods, and in some preferred embodiments are made by laminating interleaved plates (also known as "shims"), and in some preferred embodiments, shims designed for reaction channels are interleaved with shims designed for heat exchange.

In some preferred embodiments, the microchannel devices are microchannel reactors that include a plurality of microchannel reaction channels, preferably in thermal contact with a plurality of adjacent heat exchange microchannels. A plurality of microchannels may contain, for example, 2, 10, 100, 1000 or more channels. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, the heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are hereby incorporated by reference). Performance advantages in the use of this type of architecture include their relatively large heat and mass transfer rates, and the substantial absence of any explosive limits. Microchannel reactors can combine the benefits of good heat and mass transfer, excellent control of temperature, residence time and minimization of by-products. Pressure drops can be low, allowing high throughput. Furthermore, use of microchannel reactors can achieve better temperature control, and maintain a relatively more isothermal profile, compared to conventional systems. In addition to the process microchannel(s), additional features such as microchannel or non-microchannel heat exchangers may be present. Microchannel heat exchangers are preferred. Heat exchange fluids may flow through adjacent heat transfer microchannels, and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels (for example, at least 10 heat exchangers interleaved with at least 10 process microchannels. Microchannels are defined by microchannel walls that limit flow.

An "orifice" is a hole through a microchannel wall. Its length is the same as the thickness of the microchannel wall (unless it is slanted in which case its length will be slightly greater than this thickness. An "orifice" is not a T-joint or "Y" joint; in other words, two channels that flow together to form a single channel (in the shape of a "T" or a "Y") are not an orifice. In general, the mixing lengths of a T or Y-joint are considerably longer than those created by orifices in the described invention. The lengths may be two times, five times, or even 10 times longer. The longer lengths create more time with a less well mixed feed stream; the results of more time with a lower mixing quality may be a lower selectivity to the desired product, a larger device, or increased safety concerns from a potentially flammable mixture.

"Opposing orifices" are orifices at opposite sides of a microchannel that may or may not be identical in size and geometry and are aligned such that flow through the opposing orifices collide with each other inside the microchannel.

A "reaction chamber" is a portion of a microchannel that contains a solid catalyst.

A "reaction zone" is a portion of a microchannel in which a reaction occurs; this zone may contain a solid catalyst (in which case it is a reaction chamber), or a solid catalyst may be absent but design features (such as an expanded diameter) can allow a reaction to proceed.

A detonation cells size is an empirically-determined value measured when a gas-phase detonation is propagated down a tube or channel. A smoked foil inner lining records the shock wave patterns as the detonation wave proceeds through an experimental device. The passage of the detonation wave leaves a characteristic "fish-scale" pattern etched on the smoked foil, each of which is called a detonation cell. The distance from the beginning to the end of a single detonation cell in the axial direction of the tube or channel is termed the detonation cell size, $\lambda$. Empirical studies using detonation of hydrogen and other hydrocarbon compounds in the presence of oxidants indicate the minimum gap for high aspect ratio channels to support detonation transmission is at least as large as the composition detonation cell size. This guidance holds for channels of all aspect ratio. A general discussion of the concept of detonation cell size and how it can be determined is described in the following references:

Glassman, I., 1996, *Combustion*, Academic Press, 252-259.
Moen, I. O., 1993, "Transition to detonation in fuel-air explosive clouds," *Journal of Hazardous Materials*, 33, 159-192.
Berman, M., 1986, "A Critical Review of Recent Large-Scale Experiments on Hydrogen-Air Detonations," Nuclear Science and Engineering, 93, 321-347.

For purposes of the present invention, a "system" is a combination of apparatus and fluids in the apparatus. In some preferred embodiments, a system further includes properties such as pressure and flow rates.

As is accepted, conventional terminology, "tangent-to-tangent" distance is the distance between the closest edges of two orifices.

DETAILED DESCRIPTION OF THE INVENTION

Mixing Prior to a Reaction Zone

The mixing of reactants, such as oxidants and hydrocarbons, may occur upstream of a reaction chamber, preferably within a microchannel either immediately upstream from the catalyst zone or further upstream and separated by a heat exchange section or by another section for conducting a first reaction or a separation. It may be advantageous to mix streams, such as methane and oxygen, immediately after entering a device at low temperature. The combined flammable mixture may then flow through an integral heat exchanger to raise the mixture temperature prior to entering a catalytic zone housed within the contiguous microchannel.

In some embodiments, otherwise explosive mixtures can be safely handled inside microchannels due to quenching at the microchannel walls that prevents explosions or thermal runaway. The mixture may undergo additional heat exchange to raise or cool the temperature as desired. The mixture also may not undergo additional heat exchange. The resulting flammable mixture, that was formed within the microchannel, may then flow directly into a minichannel (dimensions above the critical quench diameter for the fluid mixture) where a desired homogeneous combustion reaction may occur. This can, for example, generate heat or power, or reduce emissions. A homogenous combustion reaction can be safely sparked or ignited within the minichannel with the use of embedded resistive elements (and other methods). The volume of each parallel minichannel is sufficiently small with enough surrounding metal that detonation can not occur while the homogenous combustion reaction may occur. In preferred embodiments, each dimension of a minichannel exceeds 2 millimeters. In some preferred embodiments, each dimension of a minichannel exceeds 2 mm and is no larger than 20 mm. The minimum minichannel dimension for safe operation is a function of the composition of the flammable mixture, along with the temperature and pressure. The hot gas exiting a combustion minichannel may then be further diluted with a quench stream or it may alternatively undergo rapid heat removal to add heat to an adjacent stream while also advantageously stopping the NOx formation reactions. Very low NOx is envisioned because the reactants will spend less time at the high combustion temperatures before being rapidly quenched with fast cooling (exceeding 100 degrees per second).

Mixing of a Diluent after the Reaction Zone

Figure 6:
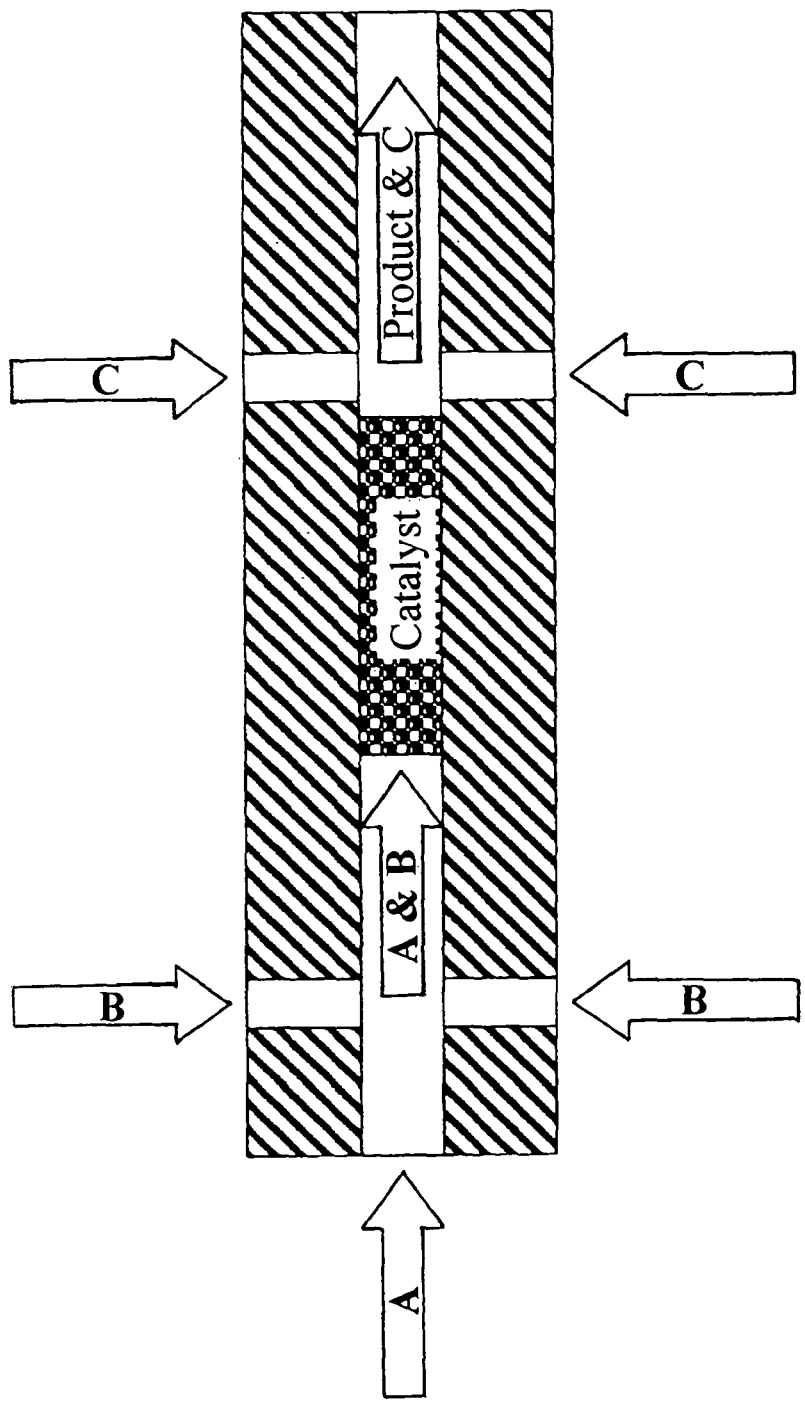
FIG. 6 schematically illustrates a system with opposing orifices two combine two fluids and a third fluid added after a catalyst zone.

A distinct fluid stream may be mixed with a product stream exiting a reaction zone. In this manner, the product mixture may be diluted to modify the composition outside of the flammable region or to add molecules (such as steam for some reactions) that directly inhibit continued undesired reactions. In many situations, it may be desirable to prevent further reactions, for example reactions catalyzed by interactions with the channel walls, non-selective homogeneous reactions caused by free radials generated in the catalyst containing section or elsewhere, or the formation of coke or carbon or polymerization of products (acrylonitrile etc.). This can be done in situ in a microchannel by the introduction of a quenching or safening agent (for example, steam, nitrogen, methane, hydroquinone etc.) into the stream at a location downstream from where the catalyst is disposed (see addition of fluid C in FIG. 6).

Diluent may be added immediately downstream of the reaction zone or may be added some distance away from the reaction zone. As an example for this latter case, a flammable mixture may exit the reaction zone of the microchannel, flow through an integral exchanger section in a connecting microchannel to remove heat, and then undergo mixing with a diluent to move the mixture composition outside of the flammable region prior to exiting the microchannel and enter large connecting macro pipes, ducts, and the like.

The addition of a diluent prior to exiting the microchannel may be part of a plant control scheme. As an example, if the conversion is low in the reaction zone such that sufficient oxygen remains to make the product mixture flammable, more diluent could be added to the product stream flowing within the microchannel before it exits the device. Further, a feed-back control loop could be employed where the measured reaction temperature or product mixture controls how much diluent is safely added to the flammable mixture in the microchannel before it exits and flows to conventional hardware. In this case, catalyst poisoning or deactivation or process upsets do not create a further downstream safety issue.

An advantage of adding the diluent near the end of the microchannel is that the diluent stream would not be required to undergo heat exchange to heat near the reaction temperature and then cool down to the exit temperature. This reduces lost work from entropic losses in recuperating energy from a stream that is heated and then cooled for the purpose of only conducting a mixing unit operation at elevated temperature.

Mixing in a Manifold

Mixing can occur in manifolds (which may or may not have a dimension of 2 mm or less), and this mixing may occur separately or in conjunction with mixing in one or microchannels to which the manifold is connected. Manifold structures are described in detail in U.S. Pat. No. 7,422,910 filed Oct. 27, 2003, which is incorporated herein as if reproduced in full below (see especially FIG. 28 and the corresponding description). The present invention includes methods in which fluid streams are mixed through orifices that form passages to a manifold.

Figure 11:
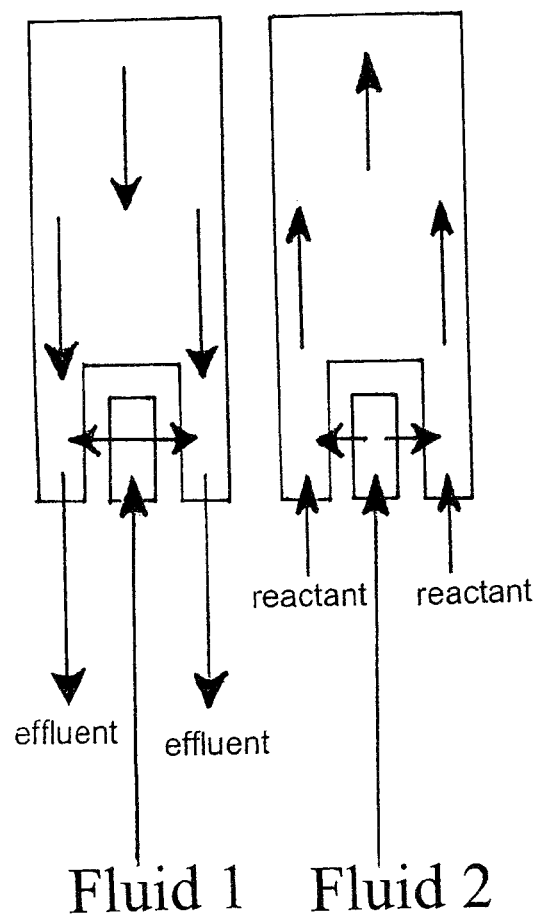
FIG. 11 schematically illustrates partial channels in a manifold region (footer or header).

For example, the addition of a diluent could be incorporated within a manifold section or other region of a microchannel device such that a minimal amount of extra device volume is required to embed this safety feature within the design. An example is schematically illustrated in FIG. 11. Partial channels are added in the manifold region to add a fluid into a footer and/or header. The fluid could be any of the fluids discussed here such as a reactant or diluent. In a preferred embodiment, diluent 1 or diluent 2 or optionally both diluents are is added to safely mix flammable mixtures or dilute flammable mixtures before they leave a microchannel and enter macro fluid connections.

Reaction Classes

Generally, the present invention relates to any process (or system or apparatus) that mixes (or is capable of mixing) at least two fluids within a microchannel. In some preferred embodiments, the process is a chemical reaction. The following is a non-limiting list of reactions in which micromixing can be employed: alkylation (liquid phase, gas phase); nitration (gas phase); oxidation (liquid Phase, gas Phase); hydrogenation/hydrocracking (liquid phase, gas phase); lithiation (liquid phase); catalytic cracking (solid/gas or 3 phase); epoxidation; and polymerization.

Designs for Mixing in Microchannels

Methods of constructing microchannel apparatus are well-known and need not be described here. Making microchannel devices by stacking sheets of materials having channels and other components cut partially or fully through the sheets is the preferred technique for making apparatus of the types described.

General Classes and Layout

In Situ mixing of two or more streams, be they reacting or non-reacting or combinations thereof, can be accomplished in a variety of ways depending upon the intent of the design. Examples of mixing schemes include:

Class 1: Designs in which the fluids to be mixed flow in alternating parallel plane (see FIG. 1);

Class 2: Designs in which the fluids to be mixed flow in the same plane (see FIG. 2);

Class 3: Designs in which the fluids to be mixed flow in the same plane and in alternating parallel planes.

Figure 1:
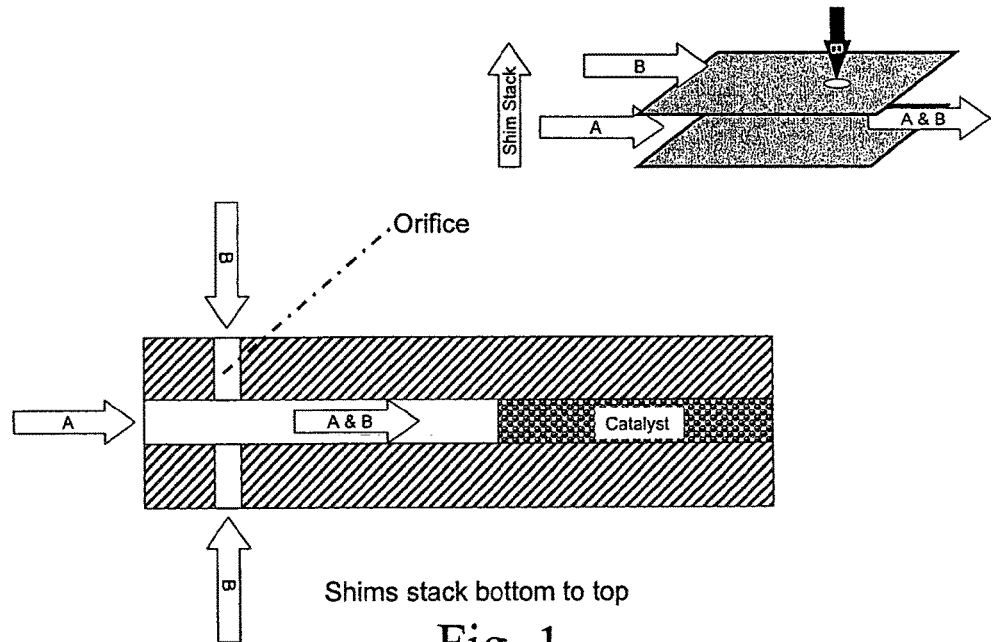
FIGS. 1 and 2 schematically illustrate shim designs for combining fluids.
Figure 2:
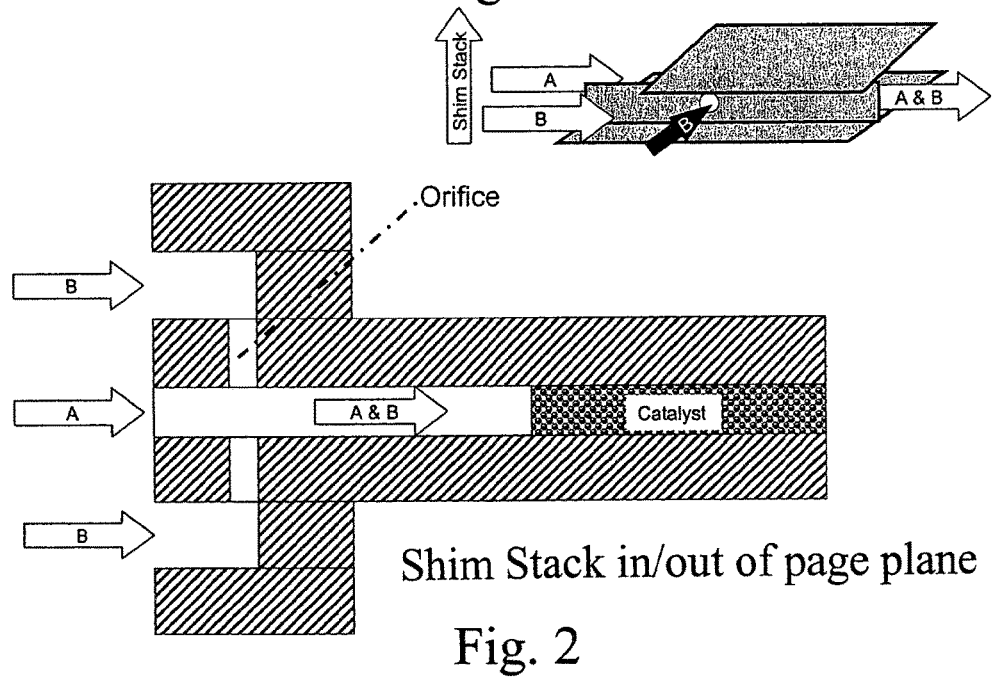

A basic Class 1 design layout can be seen in FIG. 1 in which two species, A & B, are to be mixed. Fluid A flows in a microchannel in which a catalyst is disposed. The catalyst can be of any conceivable form such as a powder, felt, fiber, foam, fin, wad, screen mesh, gauze, wall coating, or other structure. Fluid B flows in a channel that lies in a plane parallel to that in which fluid A flows. At a point prior to the point at which the catalyst is disposed in the channel fluid B is introduced into fluid A. This may be accomplished as shown in FIGS. 1 and 2 in which fluid B is introduced into fluid A from opposite sides of the channel using orifices such as circles, slots, triangles, squares, rectangles or other geometrical figures as may be appropriate for the desired mixing effect. Introduction of fluid B into fluid a may also be conducted from only one side of the channel (remove one of the orifices in FIG. 1 or 2) or, in the case of Class 3 type designs fluid B may be introduced into fluid A from three or more sides of the channel. If orifices are disposed on both sides of the channel as in FIGS. 1 and 2, the orifices need not be opposed but may be offset from one another or laid out in any way found to be appropriate. Although FIGS. 1 and 2 show 90° inlet angles, orifice walls can be sloped so that streams are mixed into each other at an angle other than 90°. In some embodiments, two orifices located in the same plain (on the same side) may be located such that the flow of one jet interacts with the flow fields produced by the other in a manner that enhances mixing. For simplicity of representation, only one orifice is shown per side in FIGS. 1 and 2. However, any number of orifices (for example, at least 2, or at least 5 orifices in one plate that connect a single microchannel with a source of another fluid—preferably this source is another microchannel) may be employed as appropriate to the specific situation. All of the subsequently described geometries are shown in the figures as Class 1, but it should be clear to anyone skilled in the art that they could be executed as Class 2 or Class 3 type schemes. In addition, figures are shown for the mixing of two fluids, A & B, but this could be extended to any number of different fluids both reacting and non-reacting.

Inter Bed In Situ Mixing

Figure 4:
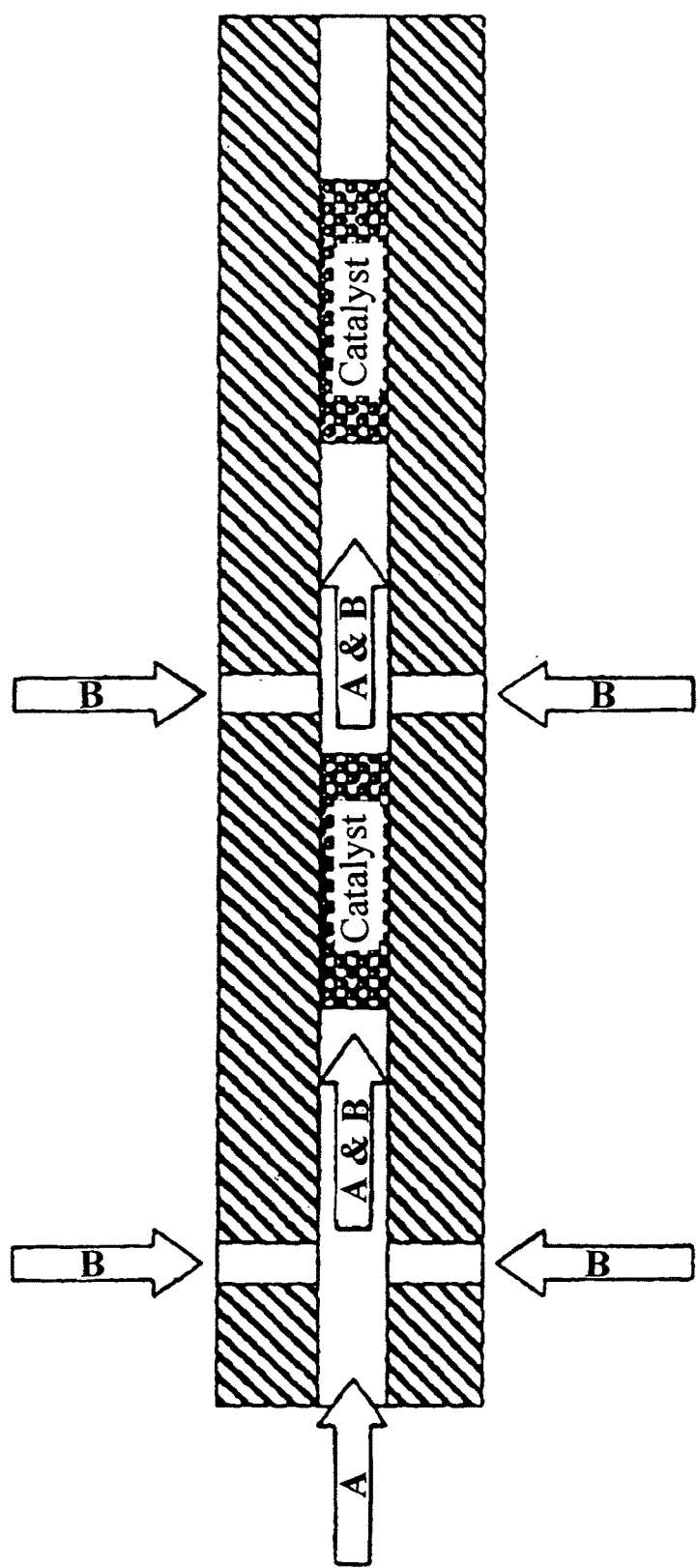
FIG. 4 schematically illustrates a microchannel reactor with staging between catalyst zones.

One application for in situ type mixing operation is the staging of reactant between catalyst zones (see FIG. 4). In this example, it may be desirable to introduce one or more streams into a flowing process stream at several axial locations along the microchannel that do not contain catalyst. This layout would be desirable, for example, in cases where the catalyst is very sensitive to one of the reactants and where high partial pressures of species B could lead to side reactions. This mode maintains a low overall partial pressure of species B and at the same time reduces the possibility that the catalyst will be exposed to high concentrations of B. In a second embodiment, different catalysts could be disposed along the channel such that ethane could be mixed with oxygen converted to ethylene and the product mixture again mixed with oxygen and allowed to pass over a catalyst to produce acetic acid. Each introduction need not be the same and different species ratios could be tailored to the suit desired reaction conditions. A third embodiment has different catalysts disposed along the channel and the second introduction of B could be replaced by third species. The number of species, catalysts and conditions and chemical transformations can be extended to any desired degree.

Structures within Mixing Zones

Figure 5:
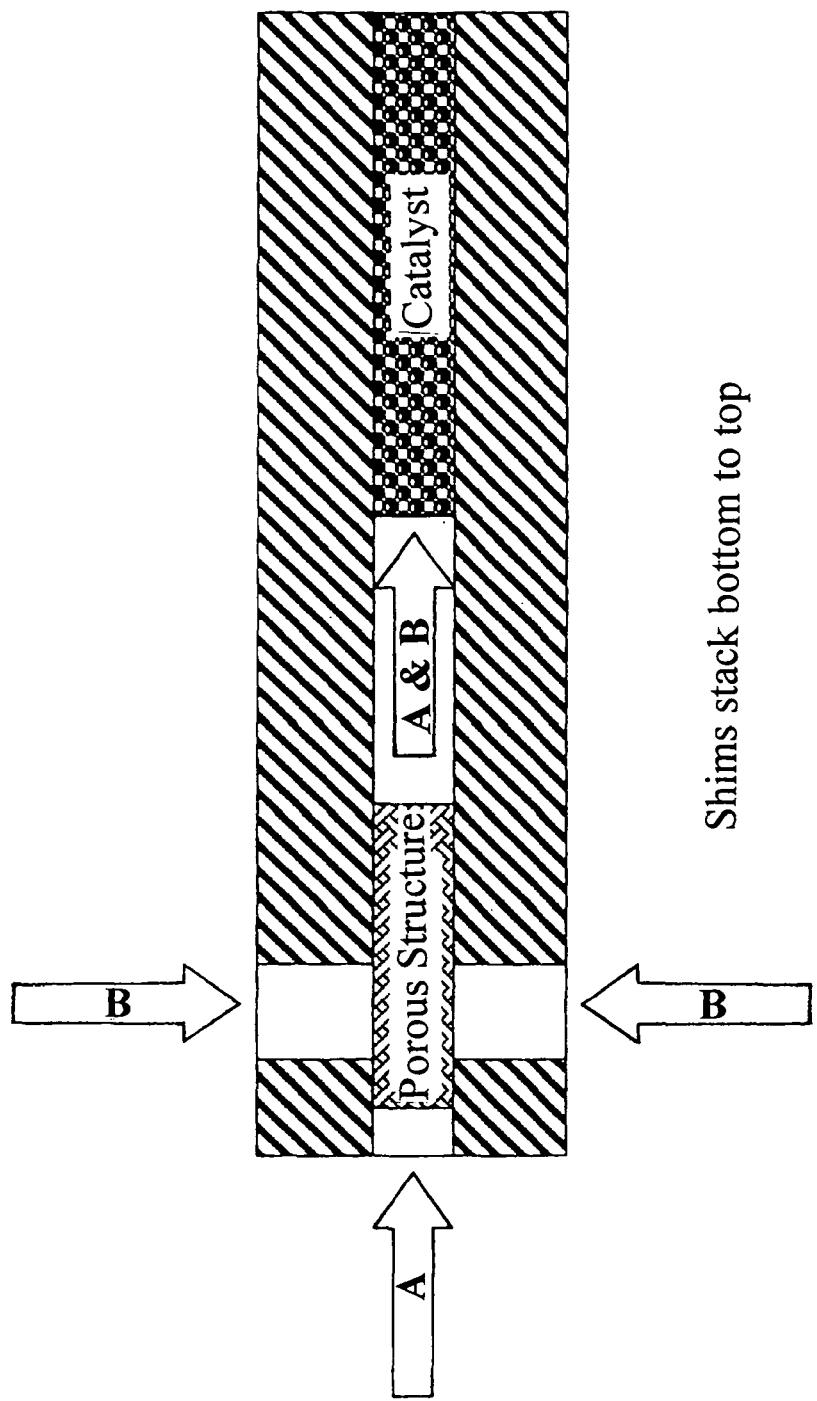
FIG. 5 schematically illustrates a porous structure in a mixing zone.

In many preferred embodiments of the present invention, a mixing zone does not contain a catalyst; however, various noncatalytic structures can be employed in the mixing zones. For example, a stream comprising two fluids can flow into and contact each other in a porous structure (see FIG. 5). This structure can be of regular proportions (such as a honeycomb cell structure) or be of random structure and could be comprised of powder, foam, felt (nonwoven), mesh or other material. The structure can have non-interconnected channels (such as a honeycomb) or interconnected (such as a foam). This layout would be suitable for situations in which A and B (or combination of any number of constituents) is highly reactive at the concentration levels that may exist while mixing is underway but that are not once the mixture is of uniform concentration (e.g., outside of flammability limits). By introducing the species in a structure with small critical diameter detonation and deflagration can be suppressed until the mixture is of uniform composition. In cases in which the final mixture is also potentially explosive or flammable the porous structure can be extended to and contact the catalyst (fin, foam, powder or other material with small diameter pores).

In Situ Mixing in Reduced Gap Zones

Figure 7:
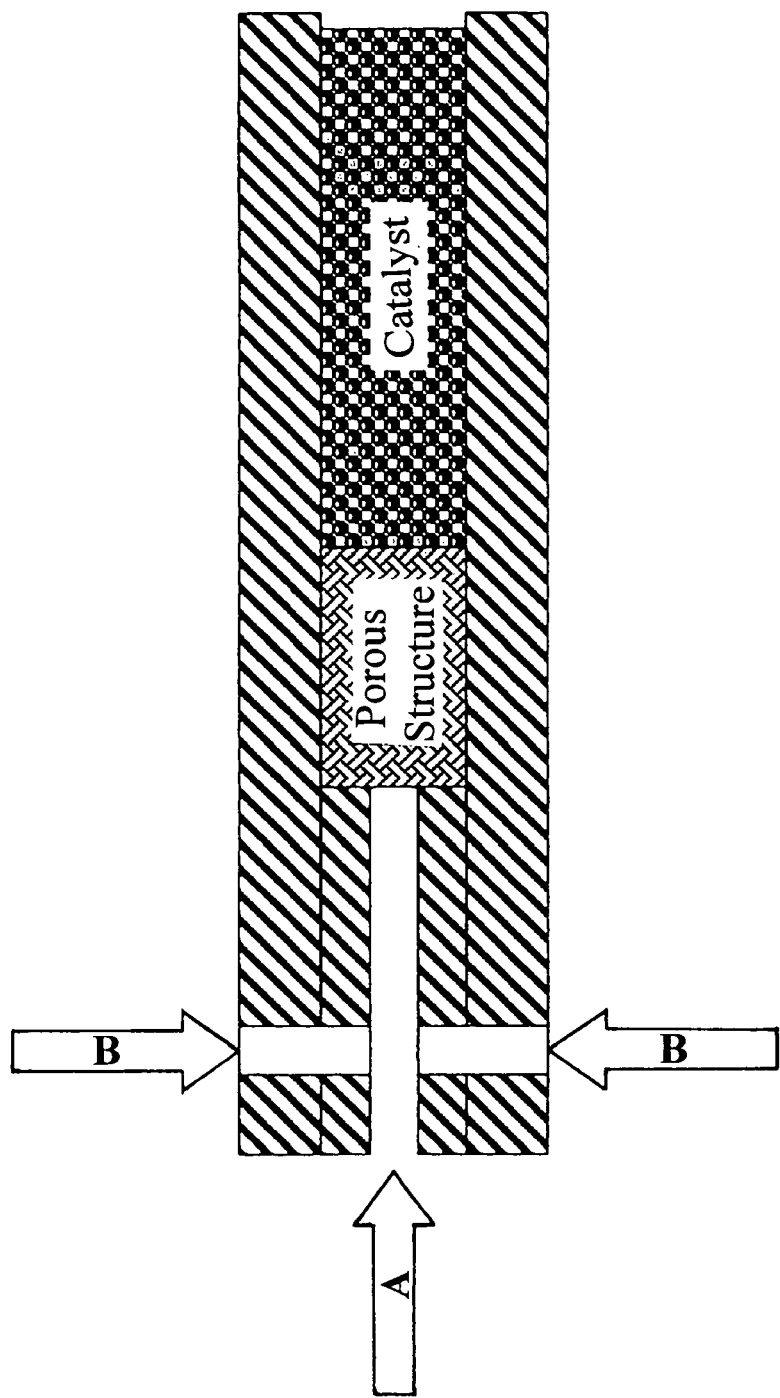
FIGS. 7-9 schematically illustrate reduced diameter zones in microchannel apparatus.
Figure 8:
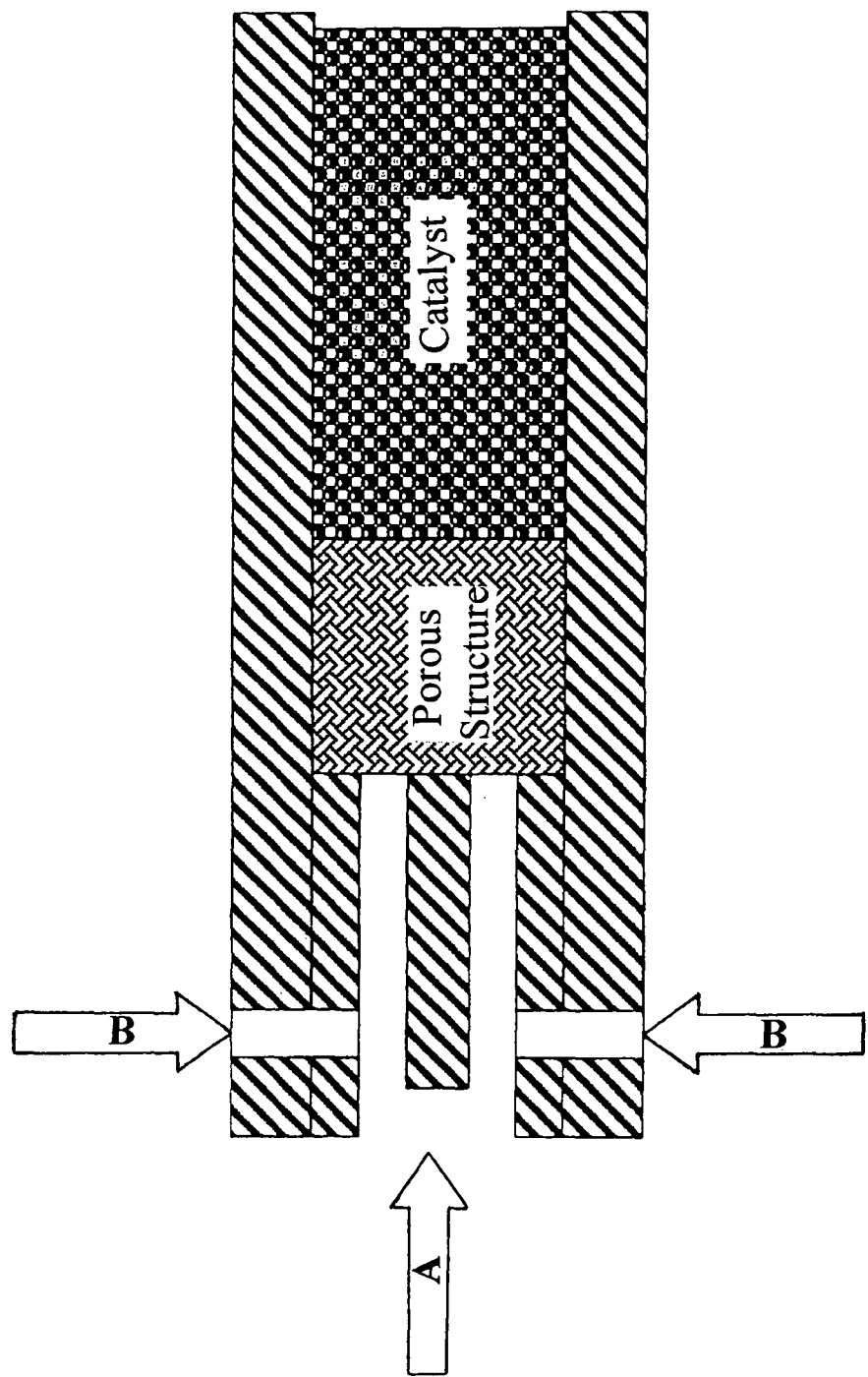
Figure 9:
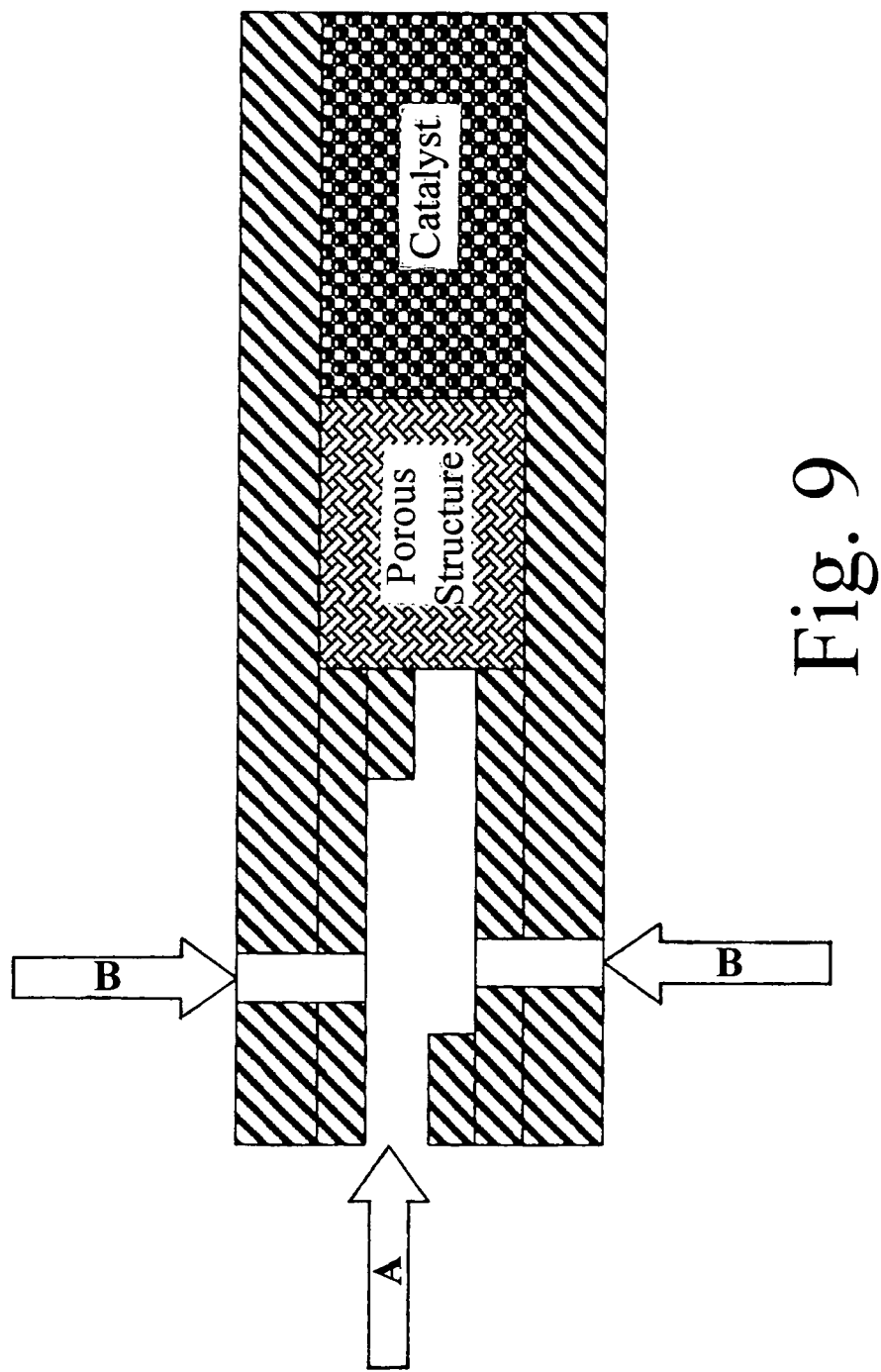

In cases where it is not possible to employ a porous contacting structure (FIG. 5) or where the quench diameter or detonation cell size is large enough it may be desirable to introduce a reactant into a fluid stream in a section of channel that contains a reduced gap. This could be accomplished by reducing the channel gap in the section containing the orifices as depicted in FIGS. 7 through 9.

Coplanar, Adjacent Channels for Heat Exchange and Fluid Distribution

Figure 10A:
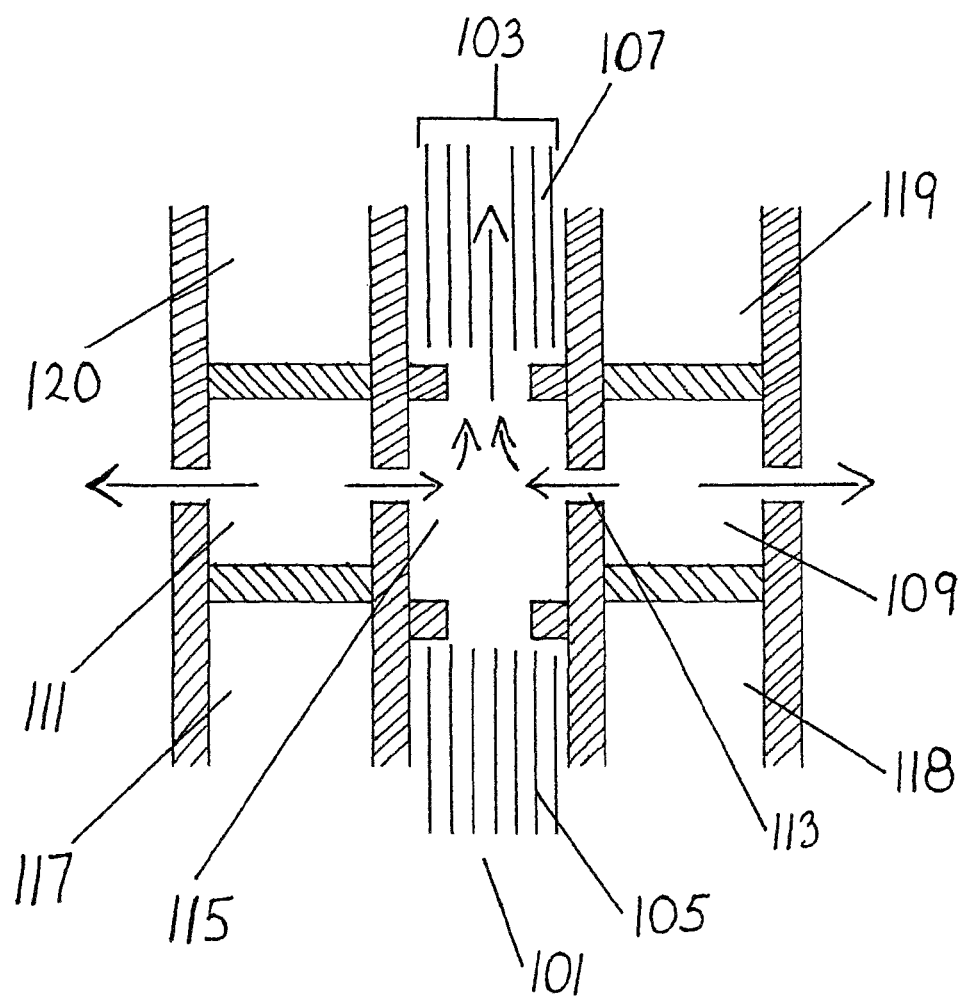
FIGS. 10a-10c schematically illustrate microchannel apparatus with coplanar, adjacent channels for heat exchange and fluid distribution.
Figure 10B:
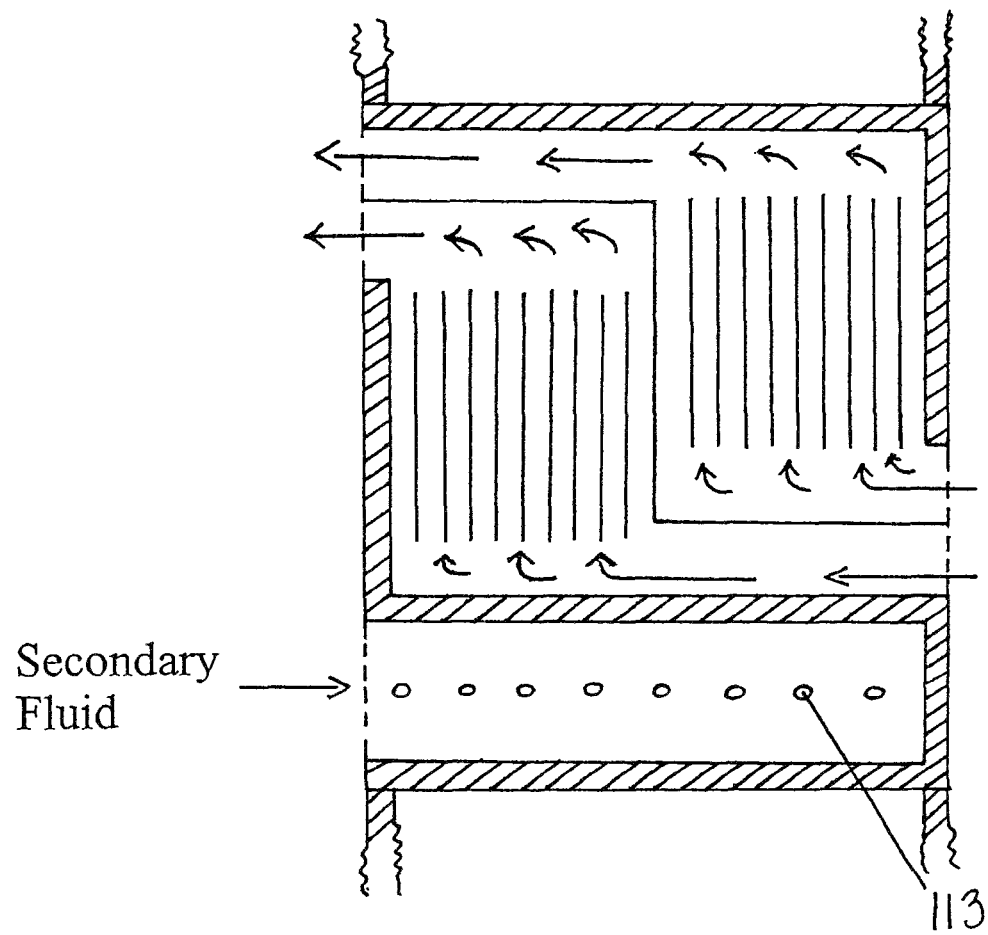
Figure 10C:
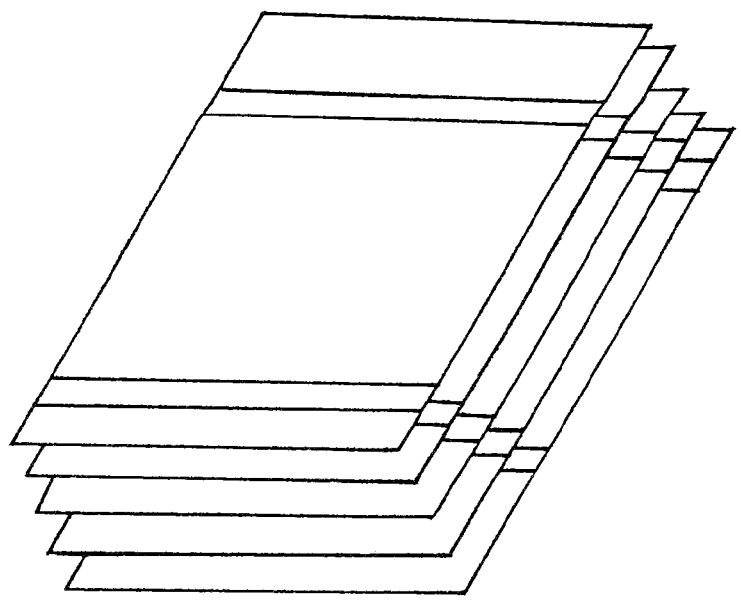

Another means of distributing and mixing of a second fluid into a first fluid flowing in a microchannel is shown in FIG. 10. The fluid distribution plenum is directly above the mixing zone in an adjacent plane. The plenum's axis is perpendicular to the axes of the unit operation microchannel array. The distribution plenum's flow comes from the side and the distribution connections to the unit operation microchannel array are used to meter the correct amount of flow to each channel. The metering can be passive or active, passive control can be obtained, for example, by controlling channel dimensions. The distribution connections can be part of the fluid distribution plenum, the wall separating two streams and the unit operation microchannel, or a combination of all or some of these channels. A fluid plenum flow that is perpendicular to the flow of the microchannels, provides room in the same plane for other unit operations such as heat removal. The section of the microchannel to which the distribution plenum delivers fluid is a mixing zone. This zone can be open to flow or may contain a static mixer or mixers, such as a porous material. In some embodiments, an orifice connects the mixing zone to a reactor zone that contains a solid catalyst. The fluid distribution plenum is separated from the other unit operations by a dividing wall that maintains a hermetic seal from the two zones. This allows the device to distribute fluid flow outside the plane stacking envelope, as pictured in FIG. 10. FIG. 10 shows the area in the fluid distribution plane separated from a heat exchange surface used to cool the reactor section.

In the particular embodiment illustrated in FIG. 10a, a process fluid 101 flows in the plane of the page in channel 103. The channel contains catalysts 105, 107. A second fluid passes through perpendicular channels 109, 111 and a portion of the secondary fluid flow passes through orifices 113 and combines with fluid 101 in mixing area 115. A set of secondary channels 117, 118, 119, 120, which run parallel to channels 109, 111 may carry a heat exchange fluid to add or remove heat to/from the process channel (in some preferred embodiments heat exchange regions are matched to catalyst-containing regions). The pattern of channels can be repeated to any desired extent; for example, at least 3 process channel layers separated by intervening layers each of which contain secondary fluid and heat exchange fluid channels. If multiple secondary fluid channels are present, they may contain different compositions; for example lower concentrations of a reactant along the length of the process channel. A segment of a layer with a secondary and heat exchange channel is illustrated in FIG. 10b. In the illustrated embodiment, the heat exchange channel contains manifolding for more equal flow distribution across the channel. Flow of the heat exchange fluid (i.e., net flow) is substantially perpendicular to the first process fluid and counter to the secondary fluid. The secondary fluid is distributed into several process channels through orifices 113. Although the illustrated process channels and secondary channels are perpendicular; it should be appreciated that other orientations are possible (although more difficult to construct).

Orifice Designs

Streams may be mixed together within a microchannel through the use of orifices or openings, such as circular, triangular, and slot jets. As is conventionally understood, an orifice is a hole through a microchannel wall; a hole is not a T-joint. Flow through these orifices is typically high, exceeding 1 m/s and in some embodiments greater than 10 m/s, and in other embodiments exceeding 50 m/s. Mixing may also be enabled by feeding a reactant through a porous plate or wall that separates two fluids. One example is the use of a sintered metal plate that maintains small average pore sizes. One such porous sintered metal plate may be obtained from MOTT and may have an average pore size ranging from 0.01 micron to 100 microns. A typical range of average pore size is from 0.1 micron to 10 microns. Preferably, however, the orifices are not pores in a porous plate having randomly distributed and tortuous porosity; instead, specifically designed configurations (such as may be formed by drilling) are preferred.

Figure 3A:
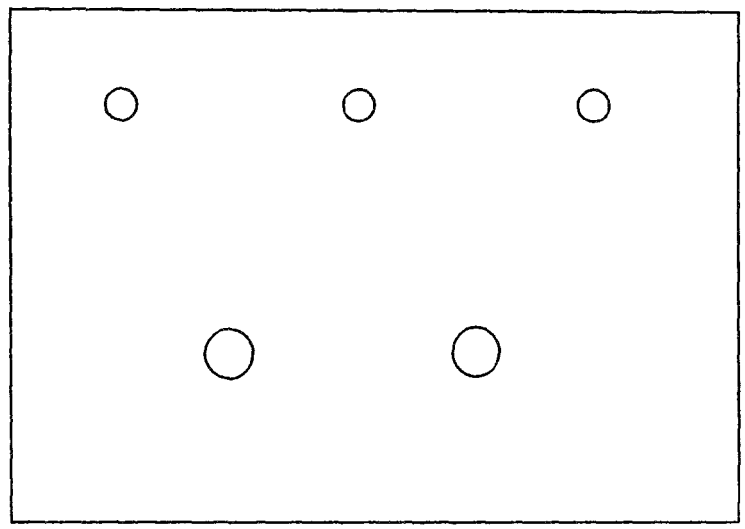
FIG. 3A-3E illustrates various examples of orifice configurations.
Figure 3B:
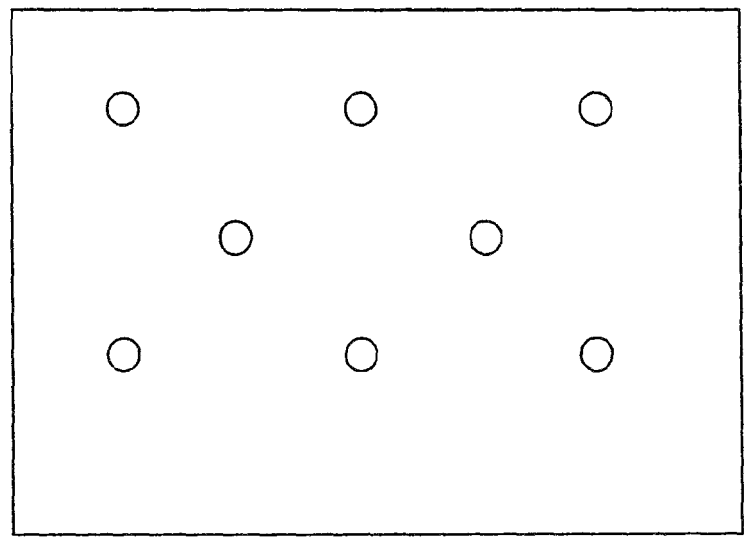
Figure 3C:
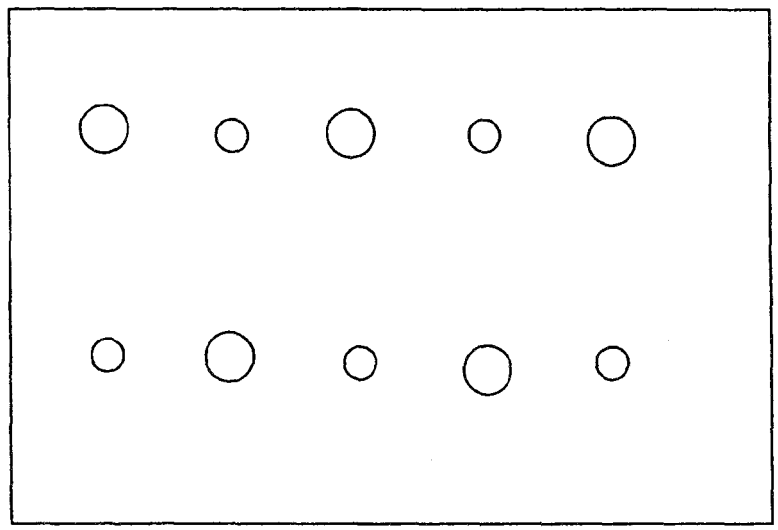
Figure 3D:
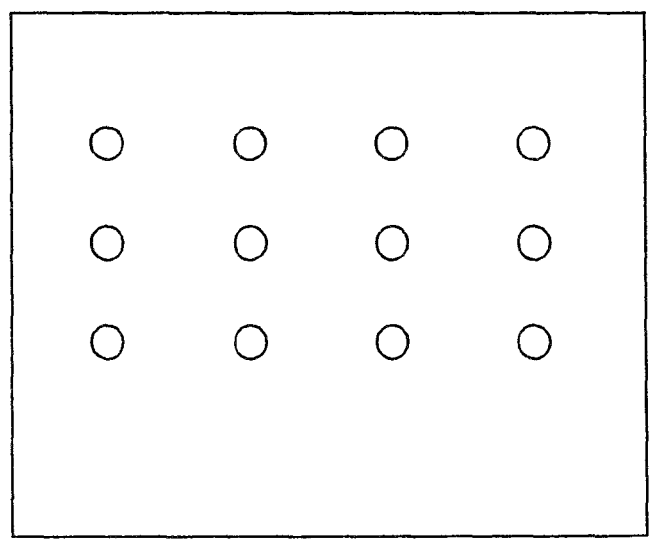
Figure 3E:
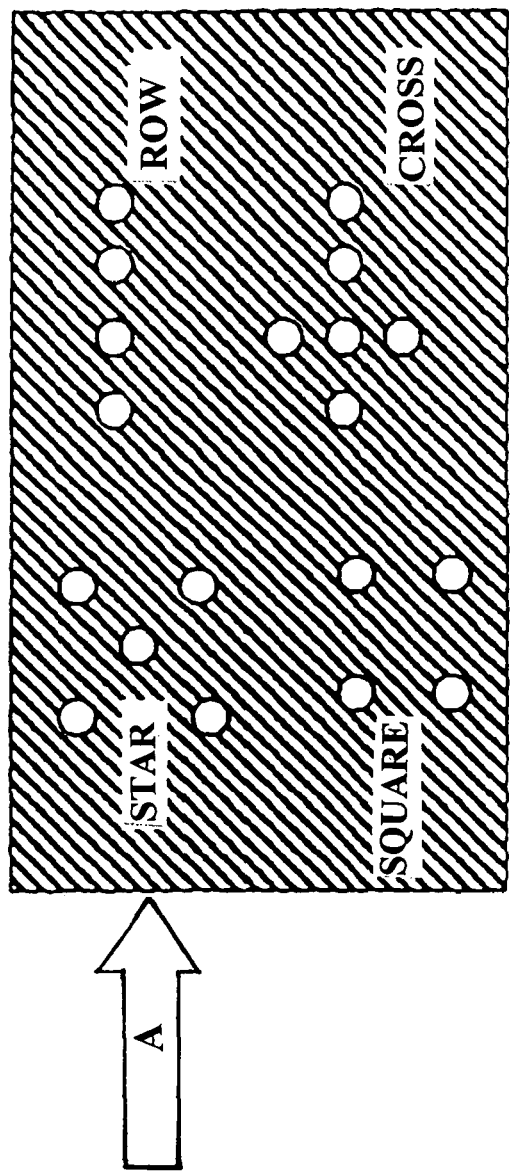

Generally, the spatial distribution of jets or the jet orifice pattern should take advantage of some degree of symmetry to effectively cause mixing across the entire cross-section of the flow channel. In rectangular micro channels, two types of jet distributions are believed to be highly effective for mixing: (1) triangular pitch jets and (2) rectangular pitch jets. In the case of triangular pitch jets, if jets of two unequal hydraulic diameters are used, the pattern generalizes to isosceles pitch with only two sides of the pitch of equal size as depicted in FIG. 3A. When all jet orifices are identical, the pitch reduces to an equilateral triangle design as in FIG. 3B. For a rectangular pitch design, if jets of unequal hydraulic diameter are used, the pattern generalizes to rectangular pitch with only two sides equal as illustrated in FIG. 3C. Should the jet orifices themselves be identical, this pattern reduces to a square pitch design as given in FIG. 3D. Finally, there are "degenerate" cases and hybrid combinations of both basic patterns as illustrated in FIG. 3E.

Figure 12:
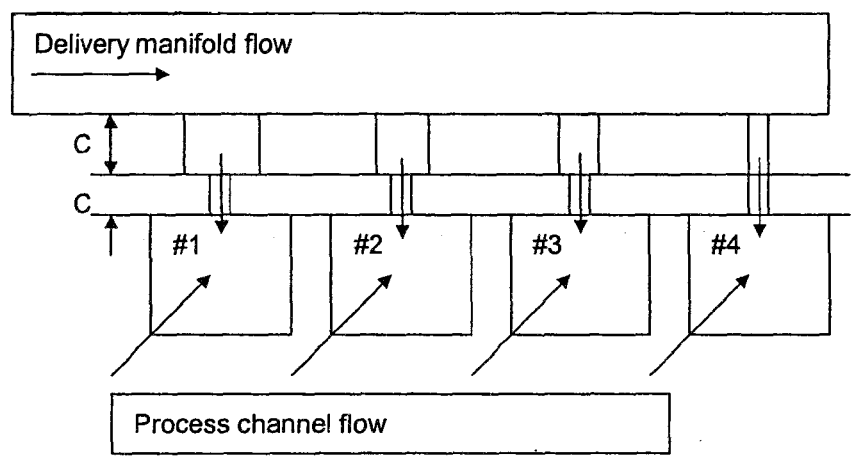
FIG. 12 schematically illustrates a design for equalizing flow through orifices.

Another consideration when designing systems that mix a fluid or fluids into microchannels is momentum effects within a channel carrying a second fluid (that is, a fluid that is to be injected). In this regard, a channel or other conduit carrying the second fluid can be treated as a manifold using the design considerations described at length in incorporated U.S. Pat. No. 7,422,910 filed Oct. 27, 2003. If the design employs a large pressure drop between the conduit carrying a second fluid and the microchannel carrying the first fluid (where the conduit and the microchannel are connected via orifices), then the orifices can have the same geometry. On the other hand, for high momentum flows, where the momentum number is 0.05 or greater, it is useful to have the orifices constricted in the direction of flow such that the increases in static pressure in the manifold from momentum compensation, generated by turning the manifold flow into the orifices, can be managed by increasing the turning losses into the orifices to achieve the desired pressure profile in the orifices. This decreases the cross-sectional area for flow into the connection and increases the turning loss from the delivery manifold to the connection. More preferably, the orifices include two cross-sectional areas, a first cross-sectional area that decreases in the direction of flow, and a second cross-sectional area that is substantially the same in each of the orifices. This is illustrated in FIG. 12. In some embodiments, it is preferred that fluid momentum out of the connection should be substantially similar from connection to connection in a given delivery manifold. This means the connection's shape and cross-sectional area need to be substantially similar for each connection for a given delivery manifold as is illustrated in FIG. 12. A nominal length (can be as small as manufacturable) $C_1$ is needed for a sudden cross-section change to accelerate (or decelerate) the flow in a second section of the connection. The first section of the connection can have a different cross-sectional area and shape than the second section. It should be appreciated that these manifolding considerations can be combined with the other orifice considerations to make more complex patterns in which more complex orifice configurations are repeated down the length of a conduit with decreasing cross-sections to adjust for momentum.

If the pressure drop into the connecting channels is low (less than $1.4 \times 10^4$ Pa) and the momentum number is lower than 0.05, the friction losses drive flow distribution more and the static pressure decreases in the direction of delivery manifold flow due to continuous friction losses. Thus the cross-sectional area of the connection's first sections ($C_2$) should increase in the direction of delivery manifold flow to lower the turning and frictional losses for the flow entering the connection. This decrease in connection flow resistance then offsets the decrease in static pressure in the delivery manifold Orifice mixing performance can be related to the momentum flux ratio and in turn to the ratios of the hydraulic diameters of the channel to the hydraulic diameter of the orifice. Based upon numerous computational fluid dynamic simulations of orifice mixing, the preferred range of ratio of mixing channel hydraulic diameter to orifice hydraulic diameter is 2 to 15, more preferably between 2.5 and 4.5, and most preferably between 3.3 and 4.5. These ranges apply to both opposing and non-opposing jets, however the orifice geometry and number of orifices may differ depending upon whether an opposing or non-opposing application is used. In preferred embodiments, each mixing section includes at least 3 opposing orifices and more preferably 5 or more opposing orifices.

It is desired to have a low pressure drop through the orifices into a process microchannel. Preferably this pressure drop is 2 pounds per square inch (psi) ($1.4 \times 10^4$ Pa) or less, more preferably 1 psi ($0.7 \times 10^4$ Pa) or less, and still more preferably 0.5 psi ($3.4 \times 10^3$ Pa) or less.

Generally when designing a micro-mix orifice configuration, there are several best practices to be followed for achieving good mixing for a minimal distance downstream of the orifice region.

Figure 15:
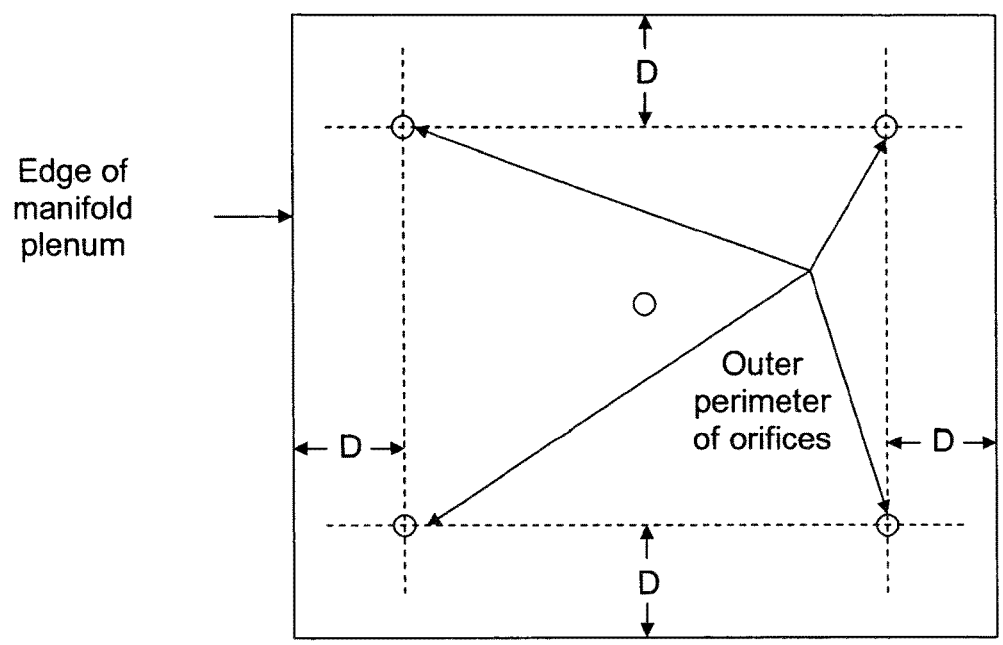
FIG. 15 is a design showing a preferred separation between the outer set of orifices and outer perimeter wall of the orifice manifold viewed in the plane of the injection orifices.
Figure 16:
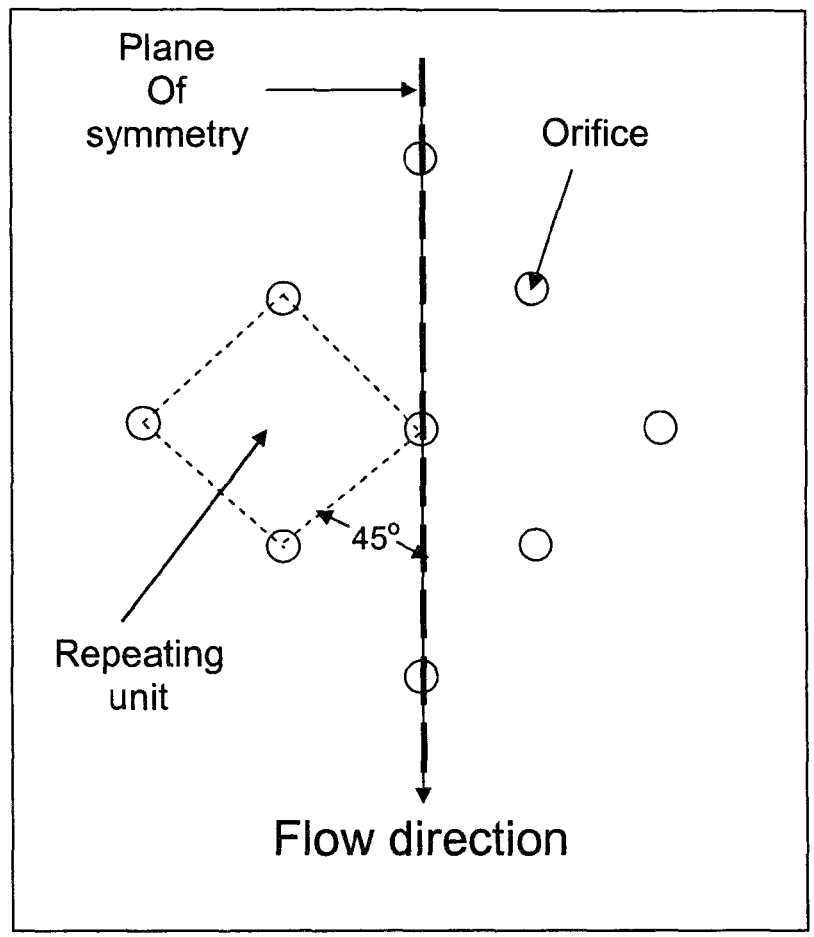
FIG. 16 illustrates an example of a preferred orifice configuration with square pitch repeating unit rotated 45 degrees relative to flow direction and plane of symmetry indicated.
Figure 17:
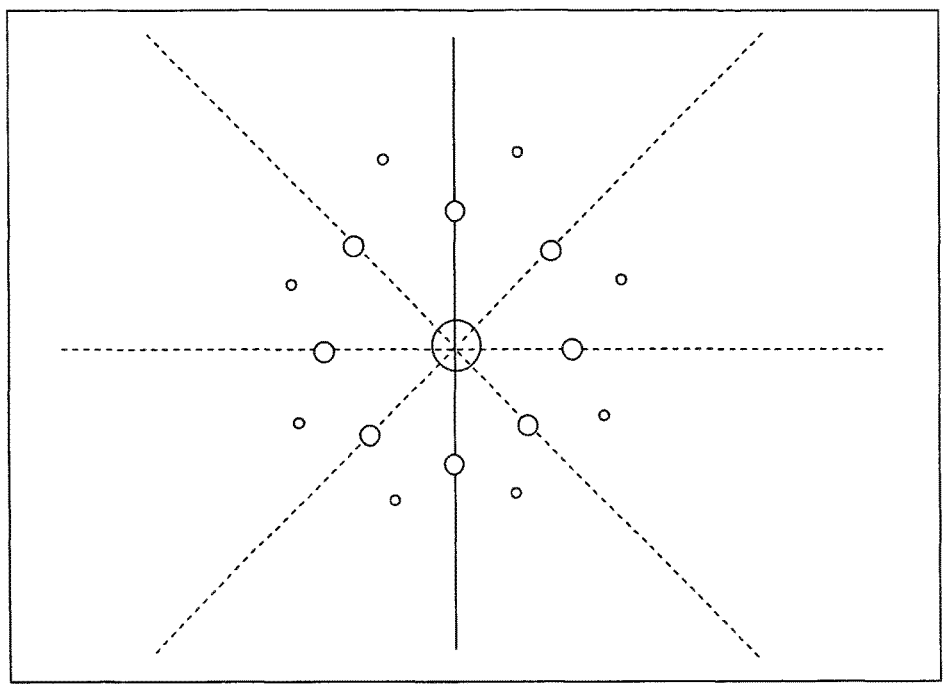
FIG. 17 illustrates an example of a preferred orifice configuration for radial distribution.

1. Injection Stream Plenum Size. The plenum dimensions as given by (127) and (128) in FIG. 13 of the example should be sized appropriately to achieve good flow distribution into the individual injection orifices. Specifically, the outer perimeter of the manifold in the plane of the stream injection orifices should exceed the outer set of jets by at least 3 orifice diameters (dimension D in FIG. 15) and more preferably 5 orifice diameters and most preferably 10 orifice diameters. Secondly, the ratio of plenum height (128) to width (127) should be at least 1:10 and more preferably 1:3 and most preferably 1:1.
2. The fluid injection orifices should be geometrically configured so that one upstream orifice does not occlude flow and prevent good mixing for a downstream orifice. Such configurations use a repeatable pattern of orifice sizes and locations where the repetition pattern comprises at least one plane of symmetry. An example of such a preferred configuration is given in FIG. 16. Preferred configurations include triangular pitch arrays, square pitch arrays when the lines representing the sides of the squares are oriented at an angle of 45 degrees to the direction of bulk stream channel flow, and radial distribution from a center orifice. If an orifice distribution radiating away from a central axis is used, it is preferred that a graded orifice size away from the central axis be used, with the orifices either increasing or decreasing in area as a function of distance from the center axis. A preferred example of radial distribution that uses a center orifice that is largest and each successive set of orifice as one proceeds from the center orifice becomes gradually smaller is illustrated in FIG. 17.
3. If only one type of orifice geometry is used, then it is preferable if they are all circular to promote interstream diffusion and good mixing. Slot orifices, triangular orifices, and other non-circular shape orifices can also be used but should be used in a particular combination to promote good mixing. The preferred combinations are given in Table 1. The invention includes orifice constructions that include these configurations, preferably in immediate order (i.e., with no intervening orifices.

TABLE 1

Preferred Configuration for Ordering of Non-Circular and Circular Orifices.

| Upstream Orifice | Downstream Orifice |
|---|---|
| Circular | Triangle with one vertex pointed downstream |
| Triangular with one vertex pointed downstream | Slot with long axis perpendicular to flow direction |
| Slot with long axis perpendicular to bulk flow direction | Triangle with one vertex pointed upstream |
| Triangle with one vertex pointed upstream | Slot with long axis pointed parallel to flow direction |
| Slot with long axis pointed parallel to flow direction | Circular |

Notes
(1) The ordering is based on nearest neighbor orifices in the flow direction,
(2) flow direction refers to bulk channel flow in the mixing zone,
(3) upstream means in the direction counter to the bulk channel flow direction from the referenced orifice,
(4) downstream means in the same direction as the bulk channel flow direction from the referenced orifice.

The selection of orifice shape is primarily driven by the decision of whether to use an opposing or non-opposing orifice design. Non-circular orifices provide the most benefit to mixing enhancement when they are used in a non-opposing application. The fluid injected by a circular orifice into a cross-flow channel stream generally diffuses more efficiently. This in turn results in a more dispersed jet plume and the momentum flux dissipates more rapidly than for non-circular plumes as the flow passes through the channel. This phenomena results from the fact that the circular orifice has everywhere the same radius of curvature as one proceeds around its perimeter. Noncircular orifices perform differently from a mixing standpoint because the radius of curvature must necessarily vary at some points as one proceeds around the orifice perimeter. This variation in curvature leads to two major flow phenomena not shared by circular orifices: (1) the axis of the orifice jet rotates by approximately 90 degrees and (2) the orifice jet plume maintains its initial shape and dissipates more slowly in the presence of cross-channel flow. The underlying physical reason why non-circular orifices behave in this manner is because regions of relatively small radius of curvature (e.g., rounded vertices of triangles or ends of elongated slots) undergo net mass flow into the jet plume whereas regions of large radius of curvature (e.g., straight or nearly straight sides) undergo a net outflow from the jet plume. Based on numerous computational fluid dynamic simulations, the following rules have been established:

1. Jet plumes associated with non-opposing circular orifices transform into a bifurcated plume or butterfly shape (see FIG. 18).
2. Jet plumes associated with slot and triangular jets bow-out along their straight edges and rotate by approximately 90 degrees (see FIG. 18).

Figure 18:
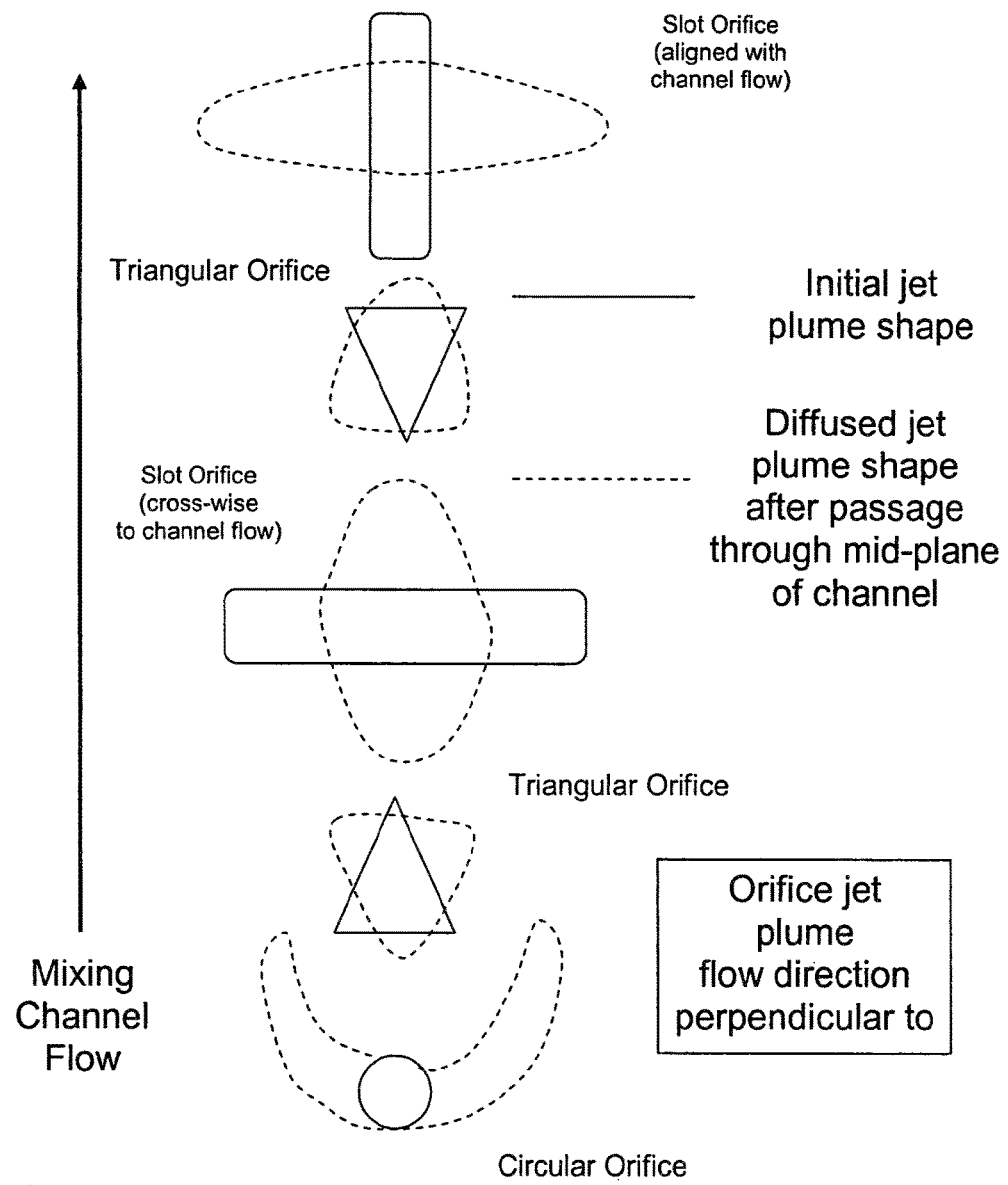
FIG. 18 illustrates various orifice jet plume shapes and orientation following injection into a mixing channel containing a cross-flowing fluid stream.

With an appropriate understanding of the flow physics of non-circular orifices, it is therefore possible to design a mixing flow pattern for a non-opposing orifice design that will more effectively deliver the first reactant fluid across the entire channel gap for a cross-flowing second fluid in a mixing channel. An example where this is useful is in applications where good mixing is required but active heat transfer in the orifice region on the opposite wall is also necessary. Because circular jets diffuse much more easily for the same flow conditions, it may not be possible to effectively mix throughout the entire mixing channel cross-section within a short mixing length without the use of non-circular orifices. Furthermore, as illustrated in FIG. 18 and specifically described in Table 1, it is possible to select the proper order of orifice geometry that will lead to fluid advection and diffusion patterns that complement one-another and offer the most homogeneous distribution of injected fluid into the mixing channel.

Flow Control for Superior Mixing Through Orifices into a Microchannel

One purpose of in-situ micro-channel mixing is to uniformly mix two or more separate streams. This process is intended to combine individual streams of different chemical composition or to bring more than one stream with different thermo-physical characteristics (such as temperature) and mix the streams to give one homogeneous fluid characterization.

A flow parameter used in assessing the efficacy of a mixing orifice design is the momentum vector of a fluid. The momentum vector is defined as follows:

$$\vec{p} = \tfrac{1}{2} m \vec{u} |\vec{u}|$$

where
$\vec{p}$=momentum vector
m=mass of moving object
$\vec{u}$=object velocity vector
$|\vec{u}|$=object velocity magnitude Generally we are dealing with a continuous fluid rather than a discrete object with mass m. Furthermore, we are most interested in the component of the momentum vector normal to the cross-sectional area of an orifice or channel. Therefore, it is more appropriate to characterize the momentum of a fluid stream through any orifice or channel by way of the momentum flux given by the following expression:

$$\frac{1}{2A} \int\!\!\int_A \rho u^2 dA'$$

where
A=cross-sectional area normal to the direction of flow
A'=cross-sectional area variable of integration
u=velocity magnitude in the cross-sectional area normal to direction of flow
ρ=fluid density The primary objective of in-situ mixing from a fluidics standpoint is to supply the appropriate type of momentum source to force the individual streams to co-mingle and overcome any mass transfer resistance to combination of the streams. Too small of a momentum source will not overcome mass transfer limitations associated with the relatively slow process of molecular diffusion. Too great a momentum source will over-drive the flow, which effectively results in the individual flow streams remaining largely separated in composition and/or thermo-physical properties.

The efficacy of the mixing process is primarily determined by (1) the ratio of the momentum flux of each orifice compared to the cumulative channel flow momentum flux and (2) the spatial orientation and separation of the orifices relative to one-another. The momentum of the mixing stream is a function of local flow rate as well as geometry and size of the orifices and channel. The flow stream configurations and orifice geometries are described in the section on classes of geometries.

The momentum flux ratio, J, is defined by the following equation:

$$J = \frac{\frac{1}{2A_o} \int\!\!\int_{A_J} \rho_o u_o^2 dA}{\frac{1}{2A_C} \int\!\!\int_{A_C} \rho_c u_c^2 dA}$$

where
$A_o$=orifice cross-sectional area
$A_c$=channel cross-sectional area
$u_o$=local orifice flow velocity magnitude
$u_c$=local channel flow velocity magnitude just upstream of the orifice
$\rho_o$=orifice local fluid density
$\rho_c$=channel local fluid density The momentum flux ratio serves as a dimensionless metric for assessing the performance of an orifice to introduce and mix a stream into a channel. Whereas the local flow patterns themselves may be quite complex and the size and geometries of the orifices vary significantly within a microchannel application, the momentum flux ratio serves as a relatively simple means of determining how effective an orifice will be for mixing. The momentum flux ratio can either be predicted from a first principles flow simulation or measured experimentally by taking the ratio of the area-weighted-average of dynamic pressure in the orifice to the area-weighted-average of the dynamic pressure in the channel immediately upstream of the orifice. Dynamic pressure is equal to the total local pressure minus the local static pressure.

The injection of fluid into a cross-flowing stream makes it possible to augment the diffusion mixing process that operates on a relatively long time scale with a momentum-driven convective mixing process operating on a much shorter time scale. Adjusting the relative contribution of the injection fluid momentum flux to the cross-flowing channel momentum flux makes it possible to balance these momentum drivers and achieve good mixing. The fluid injection process, both for one-sided orifices and opposing orifices, allows one to more efficiently achieve good mixing within a shorter mixing region. At lower values of momentum flux ratios, the orifice jet turns downstream more rapidly than for higher values of momentum flux ratio. On the other hand, high momentum flux ratios are associated with orifice jet plumes that undergo less turning downstream as it passes through the channel cross-flow. When the cross-flow channel fluid has a density significantly greater than that of the injection fluid, it is necessary to impart more force to the injection fluid to penetrate and mix with the channel flow. Conversely, when the injection fluid density is greater than that of the channel cross-flow, less momentum should be imparted so that good mixing is obtained. The momentum flux ratio takes both the relative velocity and density of the mixing streams into account to provide a means of evaluating good mixing. For good mixing to take place between streams, the momentum flux ratio is preferably in the range of between 10 and 400, more preferably between 40 and 200 and most preferably between 60 and 155. Note that these preferred ranges are equally valid for all gases or liquid.

In terms of spacing of the orifices, if the orifices are arranged on an equilateral triangular pitch array, then the preferred tangent-to-tangent spacing between jets is $6.7D_H$ to $10.2\,D_H$ where $D_H$ is the hydraulic diameter of the orifice given by the expression $$D_H = 4\frac{A}{P}$$

where A and P represent the cross-sectional area and outer perimeter of the orifice, respectively. If the orifices are arranged on a square rectangular pitch array, then the preferred spacing tangent-to-tangent from jet to jet is $5.7D_H$ to $8.6\,D_H$. The hydraulic diameter is determined from the jet dimensions and can be appropriately adjusted to give momentum flux ratios in the ranges described above.

Mixing Example

Figure 13:
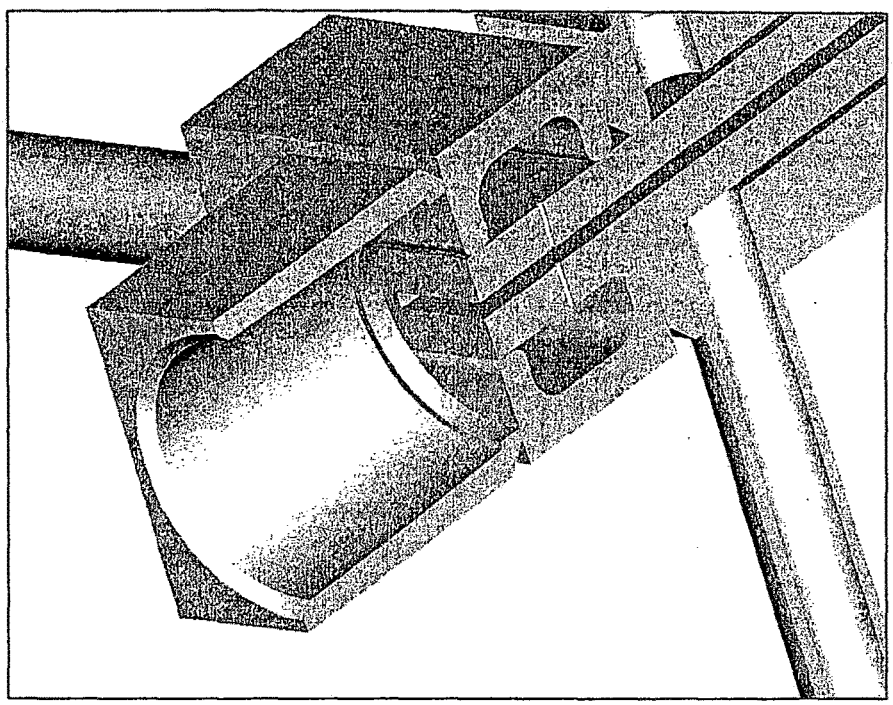
FIG. 13 is a cut-away view of a device tested for adding gas into a manifold and through holes to mix in a microchannel.
Figure 14:
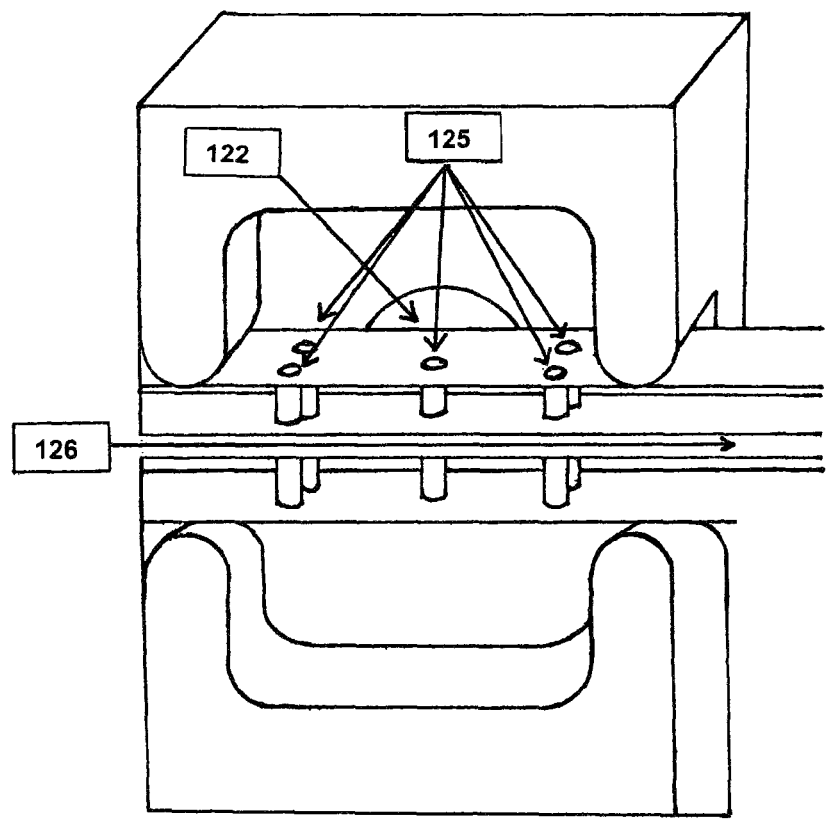
FIG. 14 is an alternate view of the device of FIG. 13.
Figure 19:
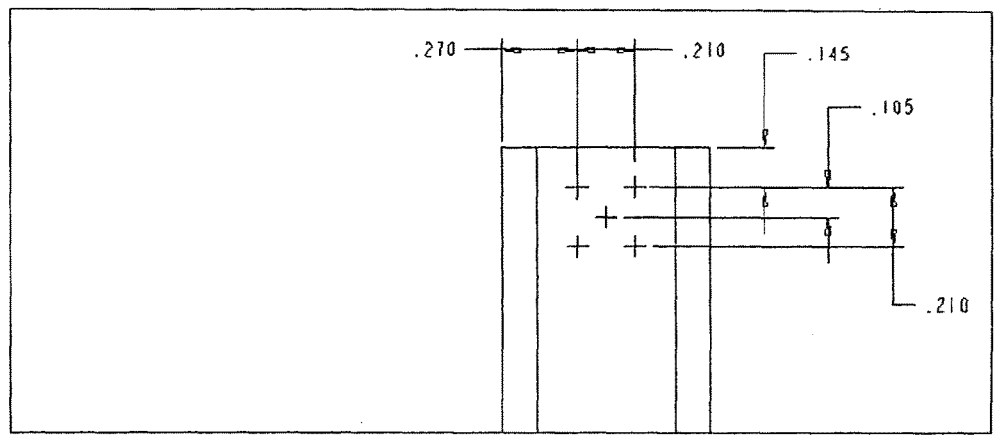
FIG. 19 shows the jet orifice configuration for the 0.500-Inch Wide Mixing Channel with a 0.040-Inch Flow Gap of the examples and FIG. 13. All dimensions are in inches. The + marks indicate circular orifices having a diameter of 0.017 inch.
Figure 20:
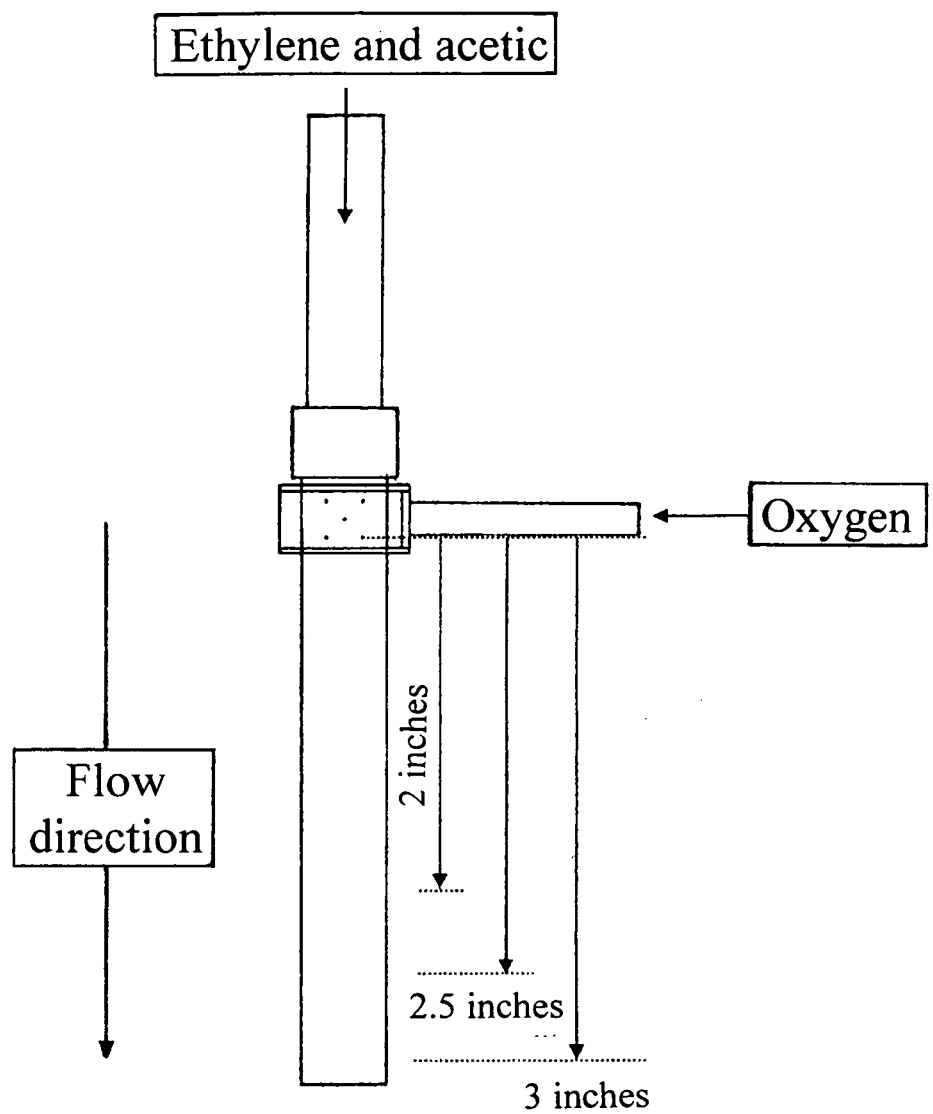
FIG. 20 is a view of the apparatus of the examples showing the lengths used for the calculations in Table 3.

One embodiment of the invention is the example of opposing jets in a mixing manifold configuration. The following example is based on a test device actually fabricated and run in the laboratory. Flow enters from channels 121 and 122 as illustrated in FIG. 13. The flow from channel 122 separates into two streams to fill plenums 123 and 124. Flow is then metered through two sets of five opposing jets (125) configured in an equilateral triangular pitch array as illustrated in FIG. 19. The jet plumes from the opposing jet orifices impinge and enhance mixing in channel 126.

Plenums 123 and 124 should be sized such that flow distribution into the individual jet ports is uniform. This requires that the width (127) to height (128) ratio of the plenum in FIG. 13 be within the range of 1:1 to 3:1. This example used a width to height ratio of approximately 2:1. The jet orifice diameter and relative spacing will depend upon the mixing channel gap height, width, and the relative flow rates and properties of the two streams in channels 121 and 122. This dependence is described in the prior section of this patent. For this example, the location of the centers of the set of five jet orifices for a 0.040-inch wide mixing channel (one set for each plenum) is given in FIG. 19.

A sample application of this example is mixing of ethylene and acetic acid with an oxygen stream. The relevant flow parameters are given in Table 2. The ethylene and acetic acid component flows through channel 121 in FIG. 13 as a pre-mixed feed. Oxygen flows through channel 122, enters plenums 123 and 124, and finally passes through the jet ports 125 to mix with the hydrocarbon stream in channel 126. The target molar ratios for each of the three individual components in the mixing stream are given as total flow molar ratio in TABLE 2.

TABLE 2

Inlet Flow Conditions for Mixing Example.

| Chemical Species | Ethylene | Acetic Acid | Oxygen |
|---|---|---|---|
| Inlet Pressure (PSIA) | 128 | 128 | 128 |
| Inlet Temperature (° C.) | 160 | 160 | 160 |
| Inlet Flow Rate (SCCM) | 36.0 | 18.0 | 6.0 |
| Total Flow Mole Fraction | 0.6 | 0.3 | 0.1 |

A detailed multi-species computational fluid dynamics calculation of the mixing of the two streams was performed using the data from Table 2 as boundary conditions for the calculations. The mole fraction distribution of each constituent species was obtained at three separation locations: 2 inches (5.1 cm), 2.5 inches (6.4 cm), and 3-inches (7.6 cm) downstream in the midplane of the mixing channel. Results from these calculations (see Table 3) show that the cross-sectional distribution of mole fraction across the width of the channel is uniform and deviates from the target mixing fraction by less than 2% within 2 inches (5.1 cm) downstream of the last two jets. Less than 2% variability in channel cross-sectional chemical species composition is considered near ideal and a variability of less than 5% is considered to be adequate for good mixing. In preferred methods of the invention, adequate mixing is achieved, in more preferred embodiments, the mixing is near ideal; these mixing qualities can occur, for example, before entering a reaction zone, or before exiting a microchannel.

TABLE 3

Mixing Results for Opposing Jets Example (downstream positions measured relative to the centers of the last two jets in the bulk flow direction).

| | 2-inches Downstream | | | 2.5-inches Downstream | | | 3-inches Downstream | | |
|---|---|---|---|---|---|---|---|---|---|
| | C2H4 | CH3COOH | O2 | C2H4 | CH3COOH | O2 | C2H4 | CH3COOH | O2 |
| Minimum Mole Frac | 0.6020 | 0.2916 | 0.0970 | 0.6031 | 0.2925 | 0.0992 | 0.6037 | 0.2930 | 0.1005 |
| Maximum Mole Frac | 0.6073 | 0.2957 | 0.1065 | 0.6061 | 0.2947 | 0.1044 | 0.6054 | 0.2942 | 0.1033 |
| Average Mole Frac | 0.6045 | 0.2936 | 0.1018 | 0.6045 | 0.2936 | 0.1019 | 0.6044 | 0.2936 | 0.1020 |

What is claimed:

1. A system that mixes fluids in a microchannel, comprising:
   a first fluid flowing in a microchannel;
   a second fluid flowing in a direction in a conduit that is adjacent to the microchannel;
   wherein the second fluid is flowing into the conduit with a momentum number of 0.05 or greater;
   wherein the second fluid flows into the first fluid in the microchannel through at least two orifices that connect the conduit and microchannel;
   wherein the at least two orifices comprise a first orifice and a second orifice and wherein the second orifice is further in said direction than the first orifice;
   wherein the first orifice comprises a first cross-sectional area and the second orifice comprises a second cross-sectional area; and
   wherein the second cross-sectional area is smaller than the first cross-sectional area.

2. The system of claim 1 wherein said first cross-sectional area of the first orifice is adjacent to the conduit; wherein said second cross-sectional area of the second orifice is adjacent to the conduit;
   wherein the first orifice comprises a third cross-sectional area that is adjacent to the microchannel;
   wherein the second orifice comprises a fourth cross-sectional area that is adjacent to the microchannel; and
   wherein the third and fourth cross-sectional areas are substantially the same.

3. The system of claim 1 wherein the orifices are not tortuous.

4. The system of claim 1 wherein the microchannel has a hydraulic diameter, and wherein the at least two orifices have hydraulic diameters, and wherein the ratio of the microchannel hydraulic diameter to hydraulic diameter of each of said at least two orifices is between 2 and 15.

5. The system of claim 1 wherein the microchannel has a hydraulic diameter, and wherein the first orifice has a hydraulic diameter, and wherein the ratio of the microchannel hydraulic diameter to the first orifice hydraulic diameter is between 2.5 and 4.5.

* * * * *